US008775969B2

(12) United States Patent
Fan

(10) Patent No.: US 8,775,969 B2
(45) Date of Patent: Jul. 8, 2014

(54) CONTACT SEARCHING METHOD AND APPARATUS, AND APPLIED MOBILE TERMINAL

(75) Inventor: Shaoting Fan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/604,020

(22) Filed: Sep. 5, 2012

(65) Prior Publication Data

US 2013/0174090 A1 Jul. 4, 2013

Related U.S. Application Data

(63) Continuation of application No. PCT/CN2011/084877, filed on Dec. 29, 2011.

(51) Int. Cl.
*G06F 3/048* (2013.01)

(52) U.S. Cl.
USPC .......................................................... 715/810

(58) Field of Classification Search
USPC .................................. 715/205–208, 784–787
See application file for complete search history.

(56) References Cited

U.S. PATENT DOCUMENTS

| 5,745,716 | A  | * | 4/1998  | Tchao et al. ................... 715/777 |
| 5,828,374 | A  | * | 10/1998 | Coleman et al. ............... 715/786 |
| 5,973,663 | A  | * | 10/1999 | Bates et al. .................... 715/786 |
| 6,166,733 | A  | * | 12/2000 | Yamada ........................ 715/776 |
| 6,772,433 | B1 | * | 8/2004  | LaJoie et al. .................... 725/52 |
| 6,966,037 | B2 | * | 11/2005 | Fredriksson et al. ......... 715/830 |
| 7,152,213 | B2 | * | 12/2006 | Pu et al. ......................... 715/812 |
| 7,293,244 | B2 | * | 11/2007 | Randall .......................... 715/784 |
| 7,453,437 | B2 | * | 11/2008 | Inui ............................... 345/156 |
| 7,676,759 | B2 | * | 3/2010  | Carter ............................ 715/783 |
| 7,698,652 | B2 | * | 4/2010  | Sagar ............................. 715/787 |

(Continued)

FOREIGN PATENT DOCUMENTS

| CN | 101039477 A | 9/2007 |
| CN | 101478585 A | 7/2009 |

(Continued)

OTHER PUBLICATIONS

International search report & Written Opinion issued in corresponding PCT application No. PCT/CN2011/084877, dated Sep. 27, 2012, and partial Chinese translation thereof, total 35 pages.

(Continued)

*Primary Examiner* — Enrique Iturralde

(57) ABSTRACT

The present invention provides a contact searching method, including: receiving first input of a user; selecting a first grapheme from a first graphemes sequence according to the first input, the first graphemes sequence being displayed on a display; where the first graphemes sequence is associated with an initial unit of characters in multiple contact labels; receiving second input of the user; selecting a second grapheme from a second graphemes sequence according to the second input, the second graphemes sequence being displayed on the display, and the second graphemes sequence being associated with a secondary unit of characters in the multiple contact labels; where each of the contact labels comprises at least two units of characters, and a unit character is formed or represented by at least one grapheme; and searching for and displaying a contact label on the display, where contact label is matched with the first grapheme and the second grapheme.

30 Claims, 13 Drawing Sheets

(56) References Cited

U.S. PATENT DOCUMENTS

| | | | |
|---|---|---|---|
| 7,937,672 B2* | 5/2011 | Casto | 715/830 |
| 7,958,456 B2* | 6/2011 | Ording et al. | 715/784 |
| 7,996,282 B1* | 8/2011 | Scott et al. | 705/27.2 |
| 8,082,518 B2* | 12/2011 | Flake et al. | 715/786 |
| 2002/0109728 A1* | 8/2002 | Tiongson et al. | 345/786 |
| 2002/0186252 A1* | 12/2002 | Himmel et al. | 345/787 |
| 2003/0008679 A1* | 1/2003 | Iwata et al. | 455/556 |
| 2003/0067495 A1* | 4/2003 | Pu et al. | 345/811 |
| 2005/0210403 A1* | 9/2005 | Satanek | 715/786 |
| 2006/0184901 A1* | 8/2006 | Dietz | 715/855 |
| 2008/0122796 A1* | 5/2008 | Jobs et al. | 345/173 |
| 2010/0057730 A1 | 3/2010 | Gao et al. | |
| 2010/0156815 A1* | 6/2010 | Silberman et al. | 345/173 |
| 2010/0251162 A1* | 9/2010 | Stallings et al. | 715/777 |
| 2011/0304649 A1* | 12/2011 | Schwesinger et al. | 345/661 |
| 2012/0036428 A1* | 2/2012 | Tsuda et al. | 715/252 |
| 2012/0042279 A1* | 2/2012 | Naderi | 715/786 |
| 2012/0327173 A1* | 12/2012 | Couse et al. | 348/14.03 |

FOREIGN PATENT DOCUMENTS

| | | |
|---|---|---|
| CN | 102549577 A | 7/2012 |
| EP | 0624965 A2 | 11/1994 |
| EP | 1862895 A1 | 12/2007 |
| EP | 2325123 A1 | 11/2012 |
| WO | 03041371 A1 | 5/2003 |

OTHER PUBLICATIONS

Office action issued in corresponding Chinese patent application 201180003733.5, Dec. 5, 2012, and English translation thereof, total 28 pages.

* cited by examiner

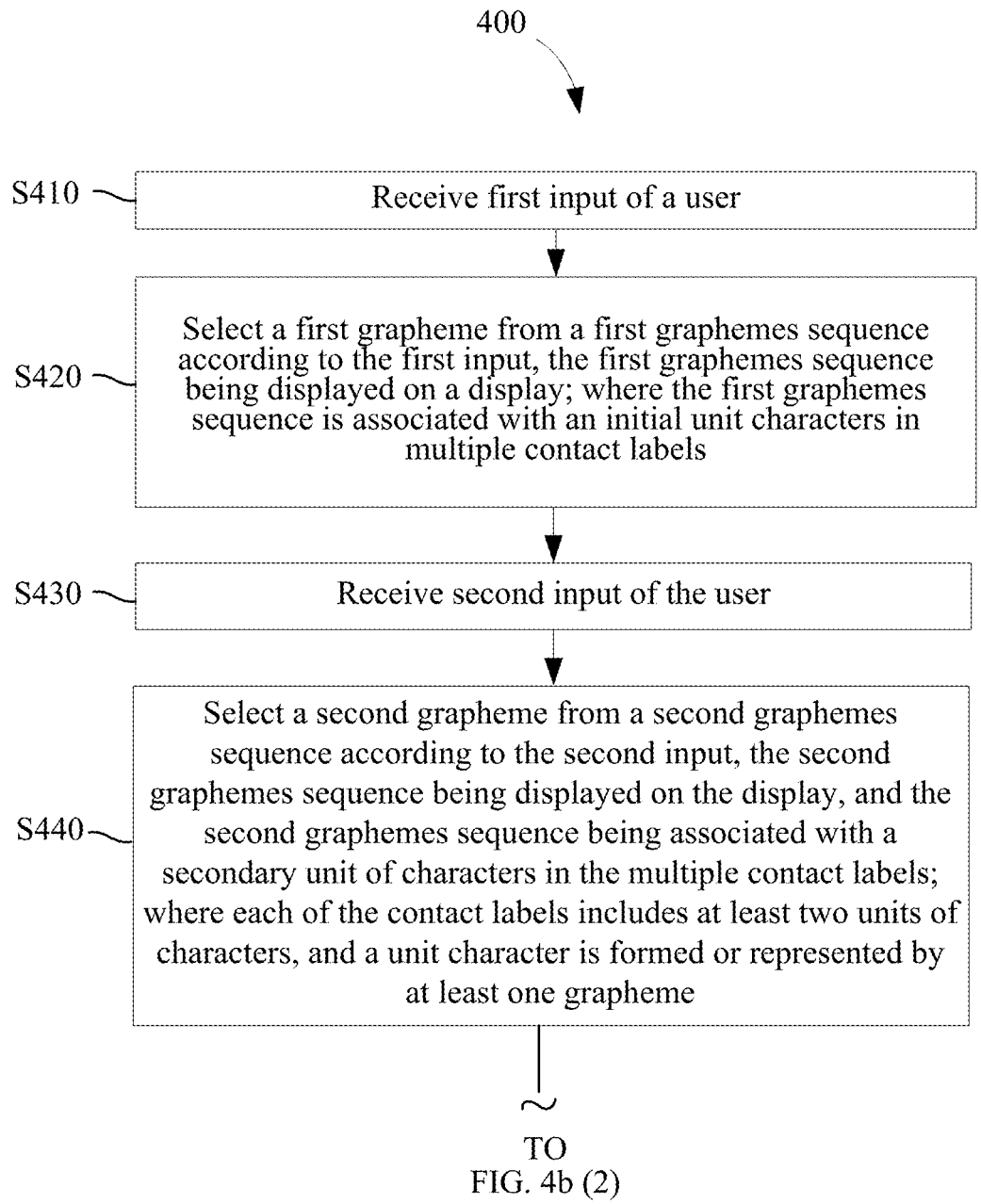
FIG. 4b (1)

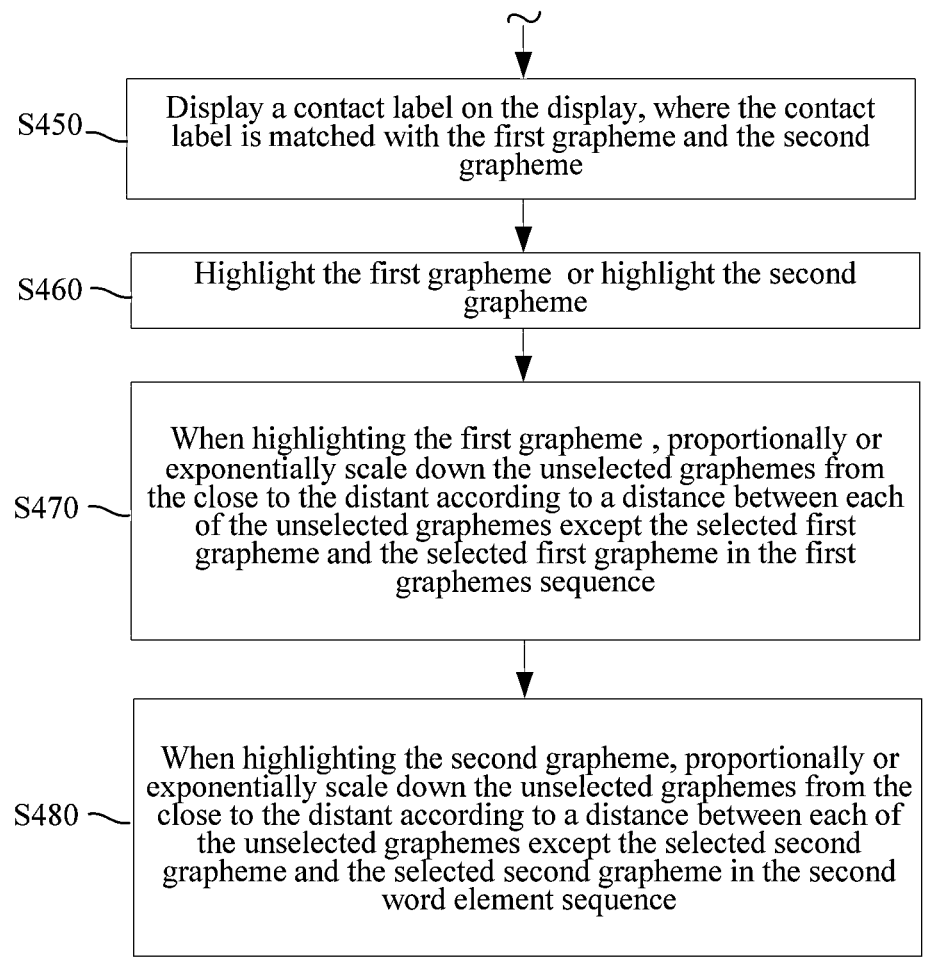
FIG. 4b (2)

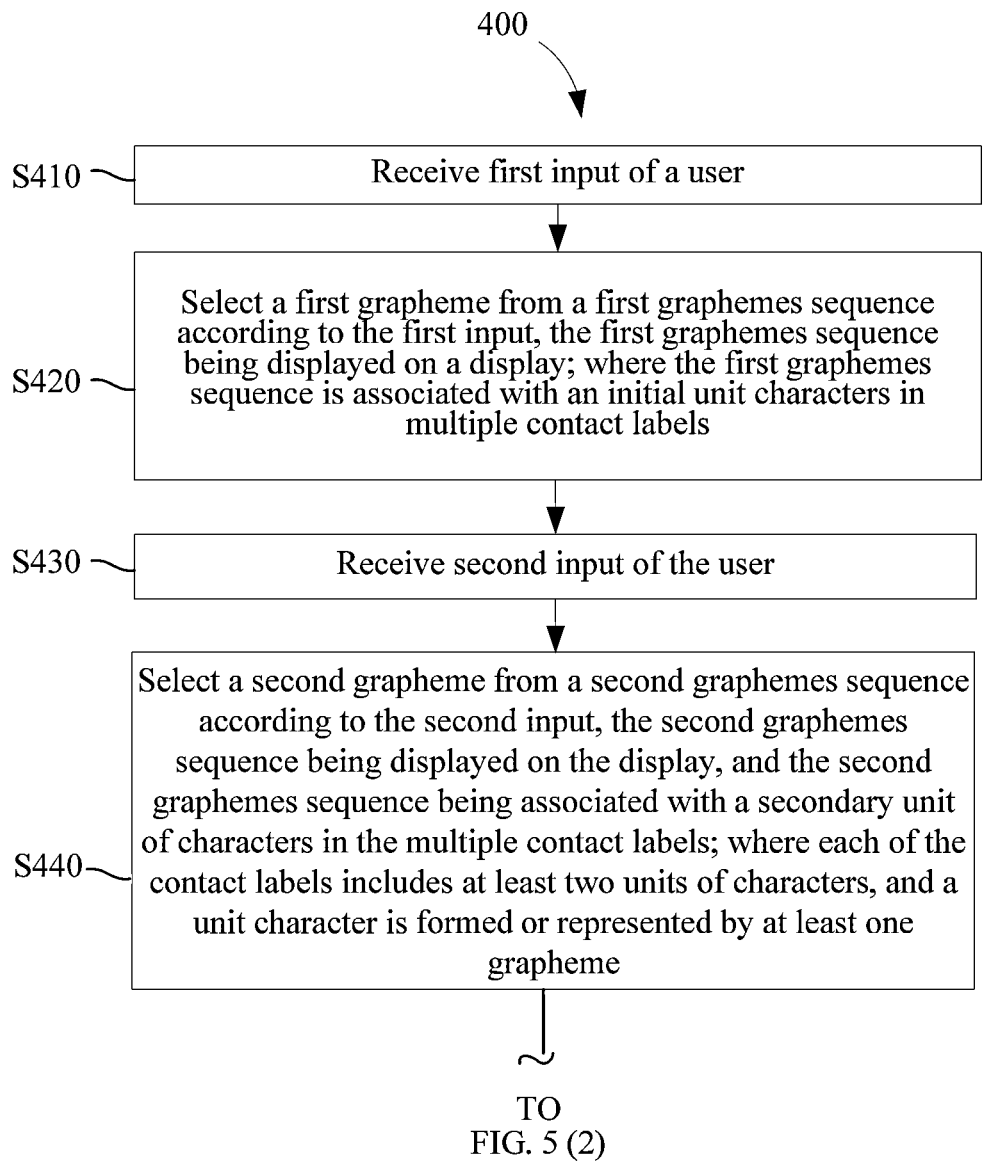
FIG. 5 (1)

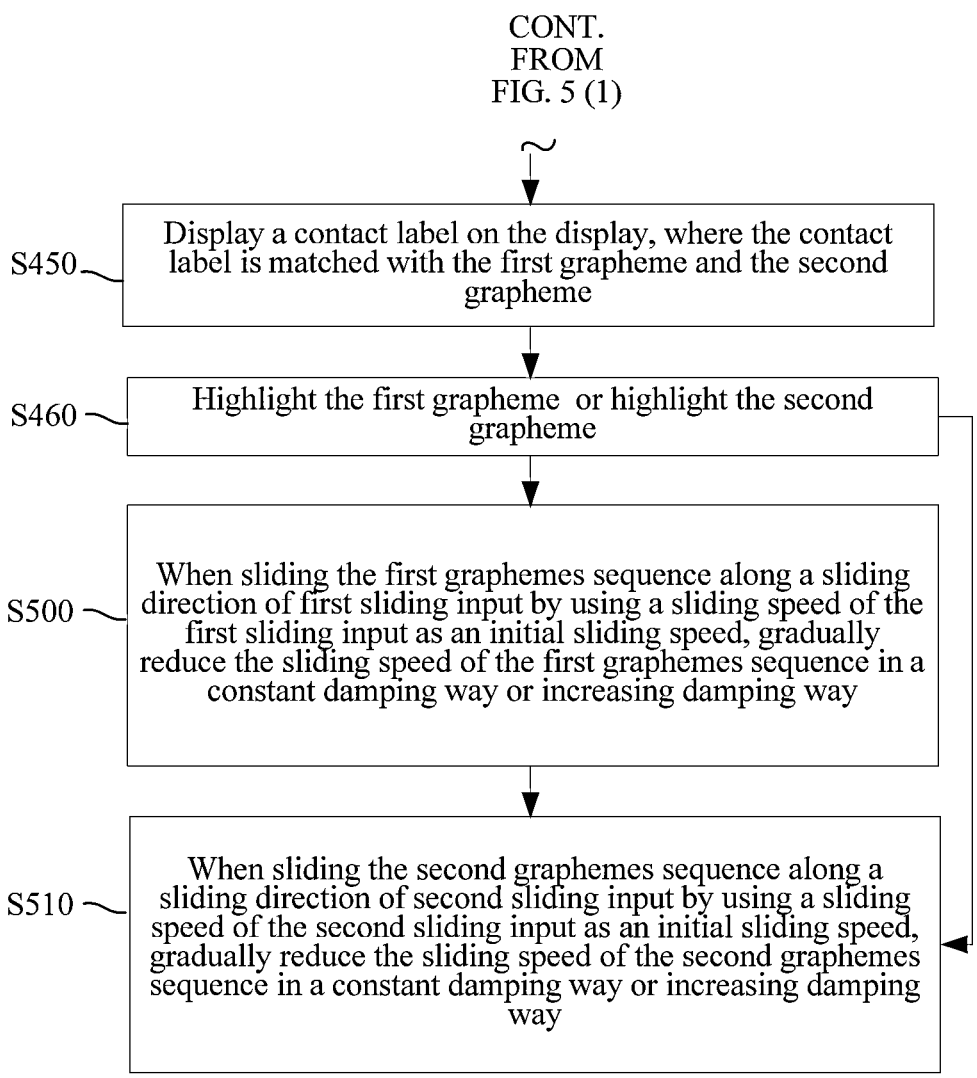
FIG. 5 (2)

CONTACT SEARCHING METHOD AND APPARATUS, AND APPLIED MOBILE TERMINAL

CROSS-REFERENCE TO RELATED APPLICATIONS

This application is a continuation of International Application No. PCT/CN2011/084877, filed on Dec. 29, 2011, which is hereby incorporated by reference in its entireties.

FIELD OF THE INVENTION

The present invention relates to the field of contact information management and searching, and in particular, to a contact searching method and apparatus, and an applied mobile terminal.

BACKGROUND OF THE INVENTION

With the development of intelligent mobile terminals and the popularity of social communication networks, the social communication scope of an intelligent mobile terminal user is greatly expanded. Therefore, the mobile terminal user has lots of contact information to manage. The current contact management manner has some obvious disadvantages in managing large amounts of contact information. For example, a contact is difficult to search for or find because the contact is generally searched for by using the first letter of an alphabetic identifier of the contact, that is, inputting the first letter of the contact in a contact search box. Because the contact information is huge, a large number of contacts having the same first letter may be searched out or found by using the first letter. These contacts having the same first letter are all displayed. In this case, the user is only capable of finding needed contact information by browsing or scrolling pages. This process is time-consuming, and does not satisfy a user's expectation for quickly searching for and locating a contact. In addition, user experience on the intelligent mobile terminal is reduced.

SUMMARY OF THE INVENTION

Embodiments of the present invention provide a contact searching method and apparatus, an applied mobile terminal, and a storage medium that stores an executable instruction of performing the contact searching method, therewith implementing quick contact searching and locating.

A contact searching method includes:
receiving first input of a user;
selecting a first grapheme from a first graphemes sequence according to the first input, the first graphemes sequence being displayed on a display, where the first graphemes sequence is associated with an initial unit of characters in multiple contact labels;
receiving second input of the user;
selecting a second grapheme from a second graphemes sequence according to the second input, the second graphemes sequence being displayed on the display, and the second graphemes sequence being associated with a secondary unit of characters in the multiple contact labels; where each of the contact labels includes at least two units of characters, and the unit of characters is formed or represented by at least one grapheme; and
searching for and displaying a contact label on the display, where contact label is matched with the first grapheme and the second grapheme.

A contact searching apparatus includes a displaying module, an inputting module, a processing module, and a searching module, where:
the displaying module is configured to display a first graphemes sequence and a second graphemes sequence;
the inputting module is configured to receive first input of a user and second input of a user;
the processing module is configured to select a first grapheme from the first graphemes sequence according to the first input and select a second grapheme from the second graphemes sequence according to the second input, where the first graphemes sequence is associated with an initial unit of characters in multiple contact labels, the second graphemes sequence is associated with a secondary unit of characters in the multiple contact labels, each of the contact labels includes at least two units of characters, and the unit of characters is formed or represented by at least one grapheme;
the searching module is configured to search the contact information including the contact labels for a contact label associated with the first grapheme and the second grapheme; and
the displaying module is further configured to display the contact label that is searched out by the searching module and is associated with the first grapheme and the second grapheme and.

A mobile terminal includes a memory, a display, and a processing apparatus, where:
the memory stores contact information, where the contact information includes multiple contact labels, each of the contact labels includes at least two units of characters, and a unit character is formed or represented by at least one grapheme;
the display is configured to generate a contact sequence according to the contact labels in the contact information, and generate a first graphemes sequence and a second graphemes sequence around the position of the contact sequence according to graphemes in the contact information; where the first graphemes sequence is associated with the first unit character in each of the multiple contact labels, and the second graphemes sequence is associated with the second unit character in each of the multiple contact labels;
the processing apparatus is configured to make a response to first input of a user and select a first grapheme from the first graphemes sequence, make a response to second input of the user and select a second grapheme from the second graphemes sequence, and search the contact information stored in the memory, according to the selected first grapheme and second grapheme, for a contact label associated with the first grapheme and the second grapheme, and send a search result to the display; and
the display is further configured to generate, according to the search result of the processor apparatus, a contact sequence including contact information of the contact label matched with the first grapheme and the second grapheme.

A readable storage medium stores an executable instruction, where the executable instruction is executed to perform the following steps:
receiving first input of a user;
selecting a first grapheme from a first graphemes sequence according to the first input, the first graphemes sequence being displayed on a display, where the first graphemes sequence is associated with an initial unit of characters in multiple contact labels;
receiving second input of the user;
selecting a second grapheme from a second graphemes sequence according to the second input, the second graphemes sequence being displayed on the display, and the second graphemes sequence being associated with a secondary unit of characters in the multiple contact labels; where each of the contact labels includes at least two units of characters, and a unit character is formed or represented by at least one grapheme; and searching for and displaying a contact label on the display, where the contact label is matched with the first grapheme and the second grapheme.

According to the contact searching method and apparatus, the applied mobile terminal and readable storage medium provided in the embodiments of the present invention, the first graphemes sequence and the second graphemes sequence are displayed on the display so that the user is capable of quickly searching out a desired contact by using a combined searching manner, thus improving contact search efficiency and user experience on the mobile terminal.

BRIEF DESCRIPTION OF THE DRAWINGS

FIGS. 4, 4a, 4b, 5, and 5a are flowchart block diagrams of multiple contact searching methods according to embodiments of the present invention.

DETAILED DESCRIPTION OF THE EMBODIMENTS

Figure 1:
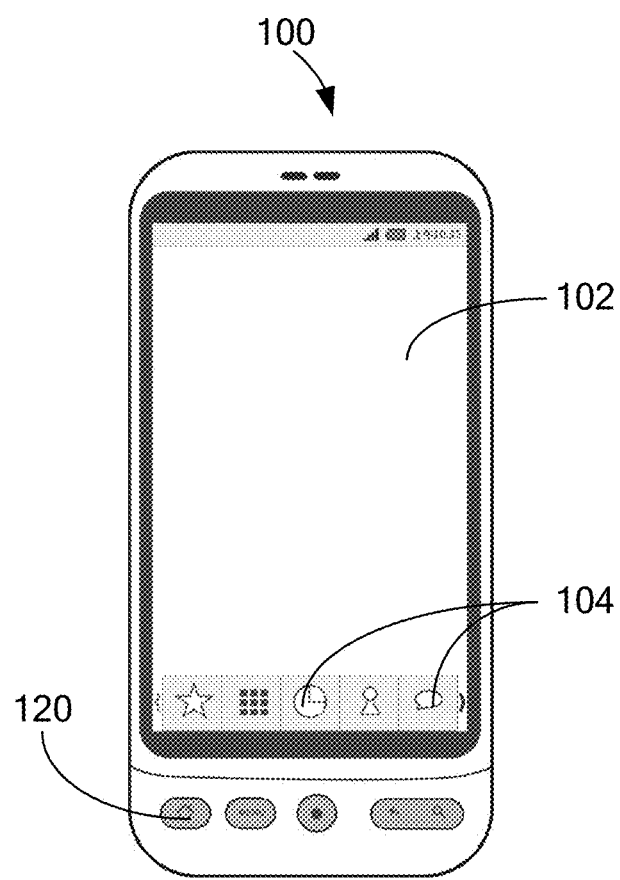
FIG. 1 is a schematic diagram of a mobile terminal 100 according to an embodiment of the present invention.

Referring to FIG. 1, a block diagram of a mobile terminal 100 for bearing and implementing the present invention is illustrated. The mobile terminal may be a data processing device, for example, a tablet, a personal digital assistant, a cellular phone, a network appliance, a camera, a smart phone, an enhanced general packet radio service (EGPRS) mobile phone, a network base station, a media player, a GPS device, an email device, a game control center, an electronic frame, and a data card, or any two or multiple of these data processing devices or of other data processing devices.

The mobile terminal 100 includes a display 102. The display 102 may be preferably a touch-sensitive display, for example, a liquid crystal display (LCD), a light emitting diode (LED) display, a carbon nanotube display, or other displays. The display 102 may be a device that is sensitive to user's touch and/or contact and integrates displaying and touch responding. The display 102 may include a multipoint touch-sensitive response function, where the multipoint touch-sensitive response refers to that the display 102 may simultaneously process multiple touch points, including processing data related to the pressure, area and/or position of each touch point. Such a multipoint touch function facilitates interaction between gestures or actions of multiple fingers and the mobile terminal 100. The mobile terminal 100 may display one or multiple graphical user interfaces on the display 102 to provide a user with various accessible system objects and send information to the user. The graphical user interface may include one or multiple selectable objects, that is, display objects. A display object provides, by using a graphical icon, an entrance of initiating a function for the user. A selectable object includes a device function, an application, a window, a file, an alarm, an event, or other identifiable system objects.

The mobile terminal 100 may implement functions of multiple devices, for example, a phone device, an email device, a network data communication device, a WiFi base station device, and a media processing device. In some implementation manners, a specific display object may be displayed on a menu of a user interface. In some other implementation manners, a device function may be accessed by using a top-layer graphical user interface, for example, calling a function corresponding to a device by using a touch manner.

In some scenarios, after a device function of the mobile terminal 100 is called, the graphical user interface of the mobile terminal 100 is changed, or enlarged, or replaced by another graphical user interface or user interface component, so as to assist the user to access and operate a specific function related to a corresponding device function. For example, in response to user's touch on a phone object, the graphical user interface of the display 102 may present display objects related to various phone functions. Similarly, touching an email object may enable the graphical user interface to present display objects related to various email functions; touching a network object may enable the graphical user interface to present display objects related to a Web browsing function; and touching a media player object may enable the graphical user interface to present display objects related to various media processing function.

Figure 2:
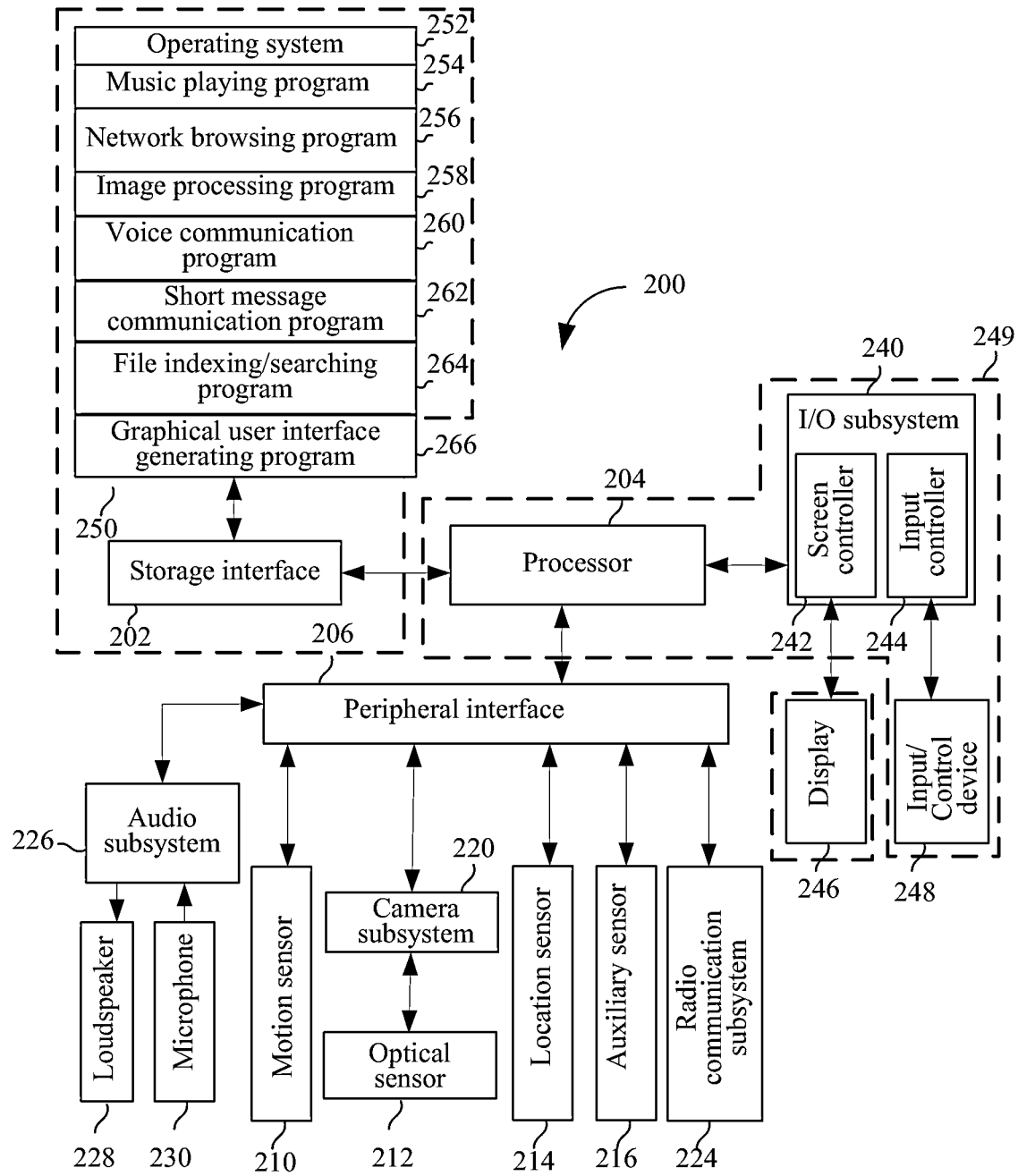
FIG. 2 is a system architecture block diagram of the mobile terminal 100 in FIG. 1.

In some other scenarios, the environment or status of the top-layer graphical user interface shown in FIG. 1 may be recovered by pressing a button 120 located around the bottom of the mobile terminal 100. In some other scenarios, each corresponding device function may have a corresponding "main interface" display object displayed on the display 102, and in addition, the environment of the graphical user interface shown in FIG. 1 may be recovered by pressing the "main interface" display object. In some other scenarios, the top-layer graphical user interface of the mobile terminal 100 may include another display object 106, for example, a short message service (SMS) object, a calendar object, a photo object, a camera object, a calculator object, a stock object, a weather object, a map object, a note object, a clock object, an address book object, and a setting object. Touching the map object, for example, may call a map drawing function, a location-based service environment, and a support function; similarly, selecting any display object 106 may call the corresponding object environment and function. Referring to FIG. 2, system architecture 200 of the mobile terminal 100 shown in FIG. 1 is illustrated. The system architecture 200 of the mobile terminal 100 may include a memory interface 202, one or multiple data processors, an image processor and/or a central processing unit 204, and a peripheral interface 206. The memory interface 202, one or multiple processors 204 and/or peripheral interface 206 may be separate components or may be integrated into one or multiple integrated circuits. Each component in the system architecture 200 may be connected by using one or multiple communication buses or signal cables. A sensor, a device, and a subsystem may be connected to the peripheral interface 206 to assist the implementation of various functions of the mobile terminal. For example, a motion sensor 210, an optical sensor 212, and a position sensor 214 may be connected to the peripheral interface 206 to assist the implementation of a motion sensing function, an environment illumination sensing function, and a position sensing function of the mobile terminal, or may collaborate with each other to implement a specific function. Another auxiliary sensor 216, for example, a positioning system (for example, a GPS receiver), a temperature sensor, a biological feature measurement sensor, an air pressure sensor, and an altitude sensor, may also be connected to the peripheral interface 206 to assist the implementation of various related functions of the mobile terminal. The system architecture 200 of the mobile terminal 100 also includes a camera subsystem 220, where the camera subsystem 220 uses the optical sensor 212, for example, a charge coupling device (CCD) or a complementary metal oxide semiconductor (CMOS) optical sensor, to assist the implementation of the corresponding image capture function of the camera subsystem. The system architecture 200 of the mobile terminal 100 may also include a radio communication subsystem 224, where the radio communication subsystem 224 is configured to enable the mobile terminal to have a radio communication function and the radio communication subsystem 224 may include a radio frequency receiver and transmitter and/or an optical (for example, infrared) receiver and transmitter. The system architecture of the mobile terminal 100 further includes an audio subsystem 226, where the audio subsystem 226 is configured to implement a voice pickup or audio signal playing function of the mobile terminal. The audio subsystem 226 includes a speaker 228 and a microphone 230 to assist the implementation of the voice pickup function and the audio signal playing function. The various foregoing components are connected to the processor 204 through the peripheral interface 206, forming the basic communication and extension function architecture of the mobile terminal 100 of the present invention, where the basic communication and extension function architecture is a basic unit for implementing functions such as the communication function and photo pickup function of the mobile terminal 100. The system architecture of the mobile terminal 100 further includes an I/O subsystem 240, where the I/O subsystem 240 is configured to enable the mobile terminal 100 to implement input output control. The I/O subsystem 240 may include a screen controller 242 and/or other (one or multiple) input controllers 244. The screen controller 242 is connected to a display 246 to control content displayed on the display 246. When the screen is a touch screen, a corresponding touch screen controller 242 is a touch screen controller. The touch screen and the corresponding touch screen controller may use any one of multiple touch-sensitive technologies to detect touch and moving or interruption of the touch. The touch technologies include but are not limited to a capacitive technology, a resistive technology, an infrared technology, and a surface sound wave technology, and other approaching sensing arrays or other components for determining one or multiple contact points by using the touch screen. The input controller 244 may be connected to another input/control device 248, where another input/control device 248 may be one or multiple buttons, rocker switches, thumb rotation switches, infrared ports, USB ports and/or point selection devices such as iron pens. In addition, the display 246 may also be configured to present a virtual button and/or keyboard to implement input control on the mobile terminal. Components such as the processing apparatus 249, the processor 204, the input controller 244, and the input/control device 248 form a basic processing apparatus 249 of the mobile terminal 100 for implementing contact searching. The components of the basic processing apparatus 249 collaborate with each other to implement contact searching. The memory interface 202 in the system architecture 200 of the mobile terminal 100 may be connected to a memory 250. The memory 250 may be a high speed random access memory and/or a non-volatile memory, for example, one or multiple disk storage devices, one or multiple optical storage devices and/or flash memories. The memory may store an operating system 252, where the operating system 252 may include instructions for processing basic system services and performing tasks of indispensable hardware. The memory 250 may also store multiple executable programs, where an executable program may be a music playing program 254, a network browsing program 256, an image processing program 258, a voice communication program 260, a short message communication program 262, a file indexing/searching program 264, a graphical user interface generating program 266, or other programs having various functions. The memory interface 202 and the memory 250 form a data access apparatus of the mobile terminal 100. By using the data access apparatus, the mobile terminal 100 may access various data and obtain various programs. The foregoing describes an exemplary mobile terminal 100 using the contact searching method and apparatus in the present invention and the universal system architecture of the mobile terminal 100. Based on the basic system architecture of the mobile terminal 100, the following describes in detail specific embodiments of the mobile terminal 100 using the contact searching method and apparatus provided in the present invention.

Figure 3:
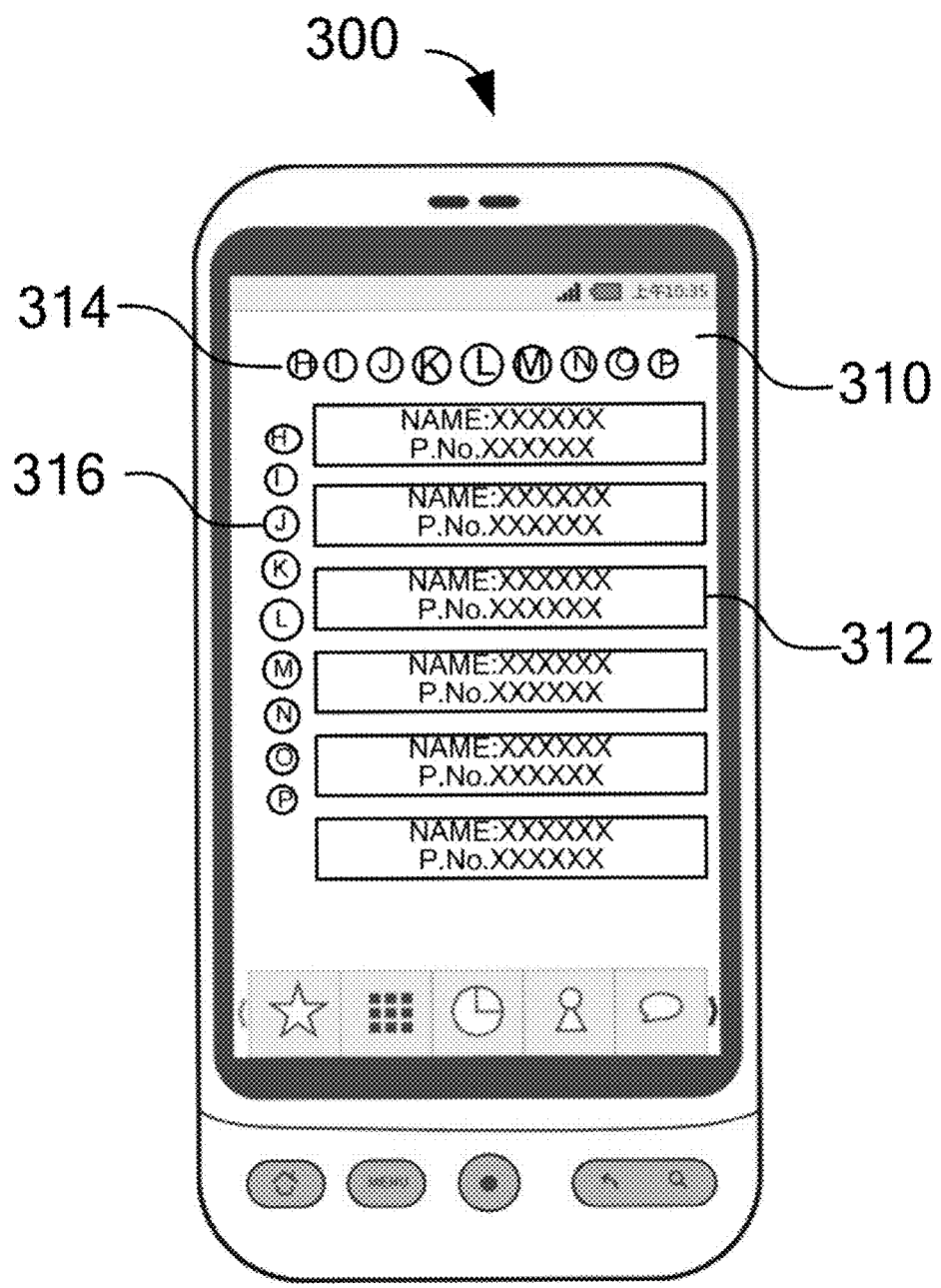
FIG. 3 is a schematic diagram of a contact searching interface generated by the mobile terminal 100 in FIG. 1.

FIG. 3 illustrates an interaction interface 310 of the mobile terminal 100, in which the interaction interface 310 is used to search for contact information, according an embodiment of the present invention. Generation of the interaction interface 310 and interaction between the mobile terminal 100 and a user that is implemented by using the interaction interface 310 involve at least the displays 102 and 246, the memory interface 202, the memory 250 in the basic architecture of the mobile terminal 100, and the processing apparatus 249 formed by components such as the processing apparatus 249, the screen controller 242, the input controller 244, and the input/control device 248, that is, the part enclosed by the broken lines in FIG. 1. In other words, the display 102, the processing apparatus 249, the memory interface, and the memory 250 are basic components for generating the interaction interface 310 and implementing the interaction between the mobile terminal 100 and the user by using the interaction interface 310. It may be understood that necessary components are not limited to hardware or software, but may be functional units that are known to those skilled in the art and capable of implementing the corresponding functions of each foregoing component, including a hardware implementation manner, a software implementation manner, or an implementation manner combining hardware and software. The following directly introduces and describes how the display 102, the processing apparatus 249, the memory interface 202, and the memory 250 implement the technical solutions of contact information searching provided in the present invention. It may be understood that technical details, such as necessary data interaction between the above components, calling of related software, and use of some auxiliary components, which are known for those skilled in the art, are not detailed here in detail. In addition, the memory interface 202 is merely configured to connect the processing apparatus 249 and the memory 250 to perform data transmission. It should be noted that during a data access process between the processing apparatus 249 and the memory 250 in the following description, the function of the memory interface 202 involved in the data access process is not to be described again.

The mobile terminal 100 includes the display 102 and the memory 250. The display 102, the processing apparatus 249, and the memory 250 are interconnected by using data buses to implement data exchange between the preceding components.

The memory 250 stores contact information, where the contact information includes multiple contact labels, each of the contact labels includes at least two units of characters, and a unit character is formed or represented by at least one grapheme.

Generally, for searching out a contact quickly, the memory 250 of the mobile terminal 100 stores the contact information, where the contact information generally has fixed information content and the information content generally includes: a contact label, a contact address, a contact phone number, a contact email address, a contact fax, a contact photo, a contact gender and so on. The information content is generally stored in the memory 250 in a certain format. Generally, the contact label is an identifiable identifier that is most commonly used for the user to differentiate contacts and search for a contact, for example, the name or denomination of a contact, but not limited to the name or denomination of the contact. In some application scenarios, another expression manner may also be used as the contact label, for example, a pictogram, a text, or a similar expression manner. In this embodiment of the present invention, the contact label includes at least two units of characters. Setting at least two units of characters in the contact label aims to ensure that the contact label satisfies a common setting manner of the name or domination of the contact. To be specific, the name of the contact generally includes two parts, that is, a given name and a family name. The unit of characters is an identifiable semantic unit formed or represented by at least one grapheme, or formed or represented, in a certain rule, by multiple graphemes. The wording "form" refers to that the unit of characters is directly formed by combining the graphemes. For example, Jone is a unit of character, where the letters J, O, N, and E are the graphemes directly forming the word Jone; or the Chinese character "周" is formed of eight strokes of left-falling (丿), break (), horizontal (), vertical (丨), horizontal (), vertical (丨), break (), and horizontal (). In this case, the left-falling (丿), break (), horizontal (), vertical (丨), horizontal (), vertical (丨), break (), and horizontal () strokes are graphemes of the "周". The wording "represent" refers to that the unit character is not directly formed by the graphemes but indirectly indicated by the graphemes. For example, a Chinese character may be represented by Pinyin or strokes corresponding to a Chinese character. For example, the Pinyin corresponding to the Chinese character "周" is "zhou", where Z, H, O, and U are letters forming the Pinyin "zhou", that is, the graphemes. Specifically, when the unit character is a Chinese character, correspondingly, the graphemes are a combination of Pinyin letters of the Chinese character; or when the unit character is a alphabetic writing word, correspondingly, the grapheme is the first letter in letters forming the word, where the word refers to a minimum semantic unit that has a definite meaning and is formed by one or multiple letters through a letter word formation manner. It may be understood that a Chinese character may be searched for by using Pinyin, or may be searched for by using strokes, for example, Wubi. Therefore, when the unit character is a Chinese character, correspondingly, the grapheme may be a stroke forming the Chinese character.

The display 102 is configured to display a contact sequence 312 generated according to the contact labels in the contact information, and generate a first graphemes sequence 314 and a second graphemes sequence 316 around the position of the contact sequence 312 according to the graphemes in the contact information; where the first graphemes sequence 314 is associated with the first unit character in each of the multiple contact labels, and the second graphemes sequence 316 is associated with the second unit character in each of the multiple contact labels.

Referring to FIG. 3, the display 102 is configured to display the contact sequence 312 generated according to the contact labels in the contact information. The contact sequence 312 may be the corresponding contact data that is generated, according to the contact labels in the contact information, by the processing apparatus 249 and screen controller 242 of the processing apparatus 249 by calling the specific contact sequence generation program stored in the memory 250. The display 102 correspondingly generates the contact sequence 312 according to generated contact data. Alternatively, an image processor associated with the display 102 may generate a corresponding contact presentation template according to the contact labels in the contact information and the contact presentation template is displayed on the display 102. The above processing manner of generating the contact sequence 312 according to the pre-stored contact information is known to those skilled in the art, and therefore the details are not described here again. For the convenience of searching, the display 102 generates the first graphemes sequence 314 and the second graphemes sequence 316 around the contact sequence 312. The first graphemes sequence 314 is associated with an initial unit of characters in multiple contact labels, and the second graphemes sequence 316 is associated with a secondary unit of characters in the multiple contact labels. The first graphemes sequence 314 and the second graphemes sequence 316 are generated for a combined search for the unit characters at different positions of the contact labels in a combined search way so as to improve search efficiency and enhance user experience. The unit characters at different positions of the contact labels specifically refer to that: the first graphemes sequence 314 is associated with the first unit character of each of the multiple contact labels and the second graphemes sequence 316 is associated with the second unit character of each of the multiple contact labels. It may be understood that the generation of the first graphemes sequence 314 and the second graphemes sequence 316 only illustrates the embodiments of the present invention. Alternatively, multiple graphemes sequences, for example, a third graphemes sequence and a fourth graphemes sequence, may be generated according to different preferences of setting the contact labels. The third graphemes sequence is associated with the third unit character of each of the multiple contact labels. Correspondingly, the fourth graphemes sequence is associated with the fourth unit character of each of the multiple contact labels, and so on.

The processing apparatus 249 is configured to make a response to first input of a user to select a first grapheme from the first graphemes sequence, and make a response to second input of the user to select a second grapheme from the second graphemes sequence. The processing apparatus 249 then searches the contact information stored in the memory 250, according to the selected first grapheme and second grapheme, for a contact label associated with the first grapheme and the second grapheme, and sends a search result to the display 102.

The processing apparatus 249 is configured to process data interaction between the user and mobile terminal 100, through the interaction interface 310. To be specific, when the user inputs a grapheme selection instruction by using the interaction interface 310, that is, the display 102, or another inputting apparatus of the mobile terminal 100, for example, the input/control device 248, that is, when the user inputs the first input and the second input, the processing apparatus 249 makes responses to the first input and the second input by using the screen controller 242 or the input controller 248, and selects the first grapheme from the first graphemes sequence according to the first input by using the processor 204 and selects the second grapheme from the second graphemes sequence according to the second input by using the processor 204. When the first grapheme and the second grapheme corresponding to the first input and the second input are obtained, the processor 204 searches the contact information stored in the memory 250 for the contact label matched with the first grapheme and the second grapheme. The associated contact label refers to that a graphemes sequence, which corresponds to or is included in the multiple units of characters forming the contact labels, includes the selected first grapheme and second grapheme. The memory 250 may be a local memory, or may be a remote memory, for example, a cloud memory accessing the data through the network. In this case, the processing apparatus 249 may initiate a request to a cloud storage server through the network. The cloud storage server searches for and finds corresponding resources according to the request from the processing apparatus 249, and feeds back a search and finding result. When the processor searches out the contact label matched with the first grapheme and the second grapheme according to the first grapheme and the second grapheme, the search result is sent by the screen controller 242 to the display 102 for display. It may be understood that the first input and the second input are used to differentiate different inputting actions rather than denote an inputting sequence. That is, the first input may be performed before the second input or after the second input, or the first input and the second input may be performed simultaneously. In addition, when the processing apparatus 249 makes a response to the first input, the display 102 displays a contact label associated with the first grapheme, where the first grapheme is the first grapheme in elements forming or representing the first unit character of a contact label.

Correspondingly, the display 102 is further configured to generate, according to the search result of the processing apparatus 249, a contact sequence including contact information of the contact label matched with the first grapheme and the second grapheme.

After receiving the search result sent by the processing apparatus 249, the display 102 updates the contact sequences according to the search result, that is, generating the contact sequences including the contact information of the contact label matched with the first grapheme and the second grapheme.

In the mobile terminal provided in this embodiment of the present invention, the first graphemes sequence and the second graphemes sequence are displayed on the display so that the user is capable of quickly searching out a desired contact by using a combinatorial searching manner, thus improving contact search efficiency and user experience on the mobile terminal.

Further, in the mobile terminal 100 provided in this embodiment of the present invention, the contact label matched with the first grapheme and the second grapheme specifically refers to that the first grapheme is the first grapheme in graphemes forming or representing the first unit character of each of the contact labels, the second grapheme is the first grapheme in graphemes forming or representing the second unit character of each of the contact labels, and the second unit character follows the first unit character.

For convenient use of the mobile terminal 100 provided in this embodiment of the present invention during a contact searching process, and better accommodation of a user operation preference, the first grapheme and the second grapheme are included in the graphemes forming the multiple unit characters of the contact label, and in addition, the first grapheme is the first grapheme in the graphemes forming or representing the first unit character of each of the contact labels, the second grapheme is the first grapheme in the graphemes forming or representing the second unit character of each of the contact labels, and the second unit character follows the first unit character. To be specific, the first grapheme and the second grapheme are only searched for and compared in the first graphemes included in the first unit character and the second unit character that form the contact label. This narrows down a search scope for searching for a corresponding contact label by the processing apparatus 249 and therefore improves the searching efficiency. In addition, the user is generally familiar with the first grapheme in the graphemes included in the unit characters of the contact labels. Therefore, such an operation manner better accommodates a user operation preference.

Further, in the mobile terminal 100 provided in this embodiment of the present invention, the display 102 uses a touch screen display to perform grapheme selection from the first graphemes sequence 314 and the second graphemes sequence 316 in a touch manner, which is applicable to the operation manner of the current mobile terminal 100.

Correspondingly, the processing apparatus 249 is configured to make a response to first sliding input of a user on the display 102, determine a sliding direction and sliding speed of the first sliding input, and then that sliding the first graphemes sequence along the sliding direction of the first sliding input by using the sliding speed of the first sliding input as an initial sliding speed is displayed on the display 102; and select, from the first graphemes sequence, a grapheme, which corresponds to a preset first grapheme selection position as the first grapheme when the first graphemes sequence stops sliding.

When the grapheme selection from the first graphemes sequence 314 and the second graphemes sequence 316 are performed in the touch manner, the selection may be performed by directly clicking a corresponding grapheme. However, considering the probability that such a directly-clicking manner may cause maloperation and the fact that the graphemes may not all be simultaneously displayed in a grapheme list on the display if an actual screen is not large enough, this embodiment of the present invention provides a manner for selecting the first grapheme and the second grapheme by sliding the first graphemes sequence 314 and the second graphemes sequence 316. To be specific, the processing apparatus 249 processing apparatus 249 makes a response to the first sliding input of the user on the display 102, and determines the sliding direction and sliding speed of the first sliding input, and then that sliding the first graphemes sequence along the sliding direction of the first sliding input by using the sliding speed of the first sliding input as an initial sliding speed is displayed on the display 102; and when the first graphemes sequence stops sliding, selects a grapheme, which corresponds to a preset first grapheme selection position and is in the first graphemes sequence, as the first grapheme, where the preset first grapheme selection position is a default position or a position specified according to user requirements; for example, a specific position mark is set on the display 102, and a grapheme at the position corresponding to the mark is selected as the first grapheme. The sliding the first graphemes sequence 314 by using the sliding speed of the first sliding input as an initial sliding speed enables the sliding of the first graphemes sequence 314 to meet the user expectation. For example, the user may slide the first graphemes sequence 314 at different sliding speeds according to the position of an expected grapheme in the first graphemes sequence 314, thus realizing the goal of selecting a desired grapheme from the first graphemes sequence 314 quickly. For example, when the expected grapheme is the last grapheme in the first graphemes sequence 314, the user may slide the first graphemes sequence at a higher speed; when the expected grapheme is a relative front grapheme, the user may slide the first graphemes sequence 314 at a lower speed in case that a high speed sliding causes the expected grapheme goes beyond the first grapheme selection position. When the first graphemes sequence stops sliding, the grapheme, which corresponds to the preset first grapheme selection position and is in the first graphemes sequence, is selected as the first grapheme. Alternatively, in the present invention, the manner for selecting the first grapheme is not limited to the above manner. In the above operation manner, after an operator assigns an initial sliding speed for the first graphemes sequence 314, the first graphemes sequence 314 may slide at the assigned initial sliding speed. During the sliding process of the first graphemes sequence 314, the user does not intervene the sliding of the first graphemes sequence 314. However, in some scenarios, the user needs to precisely select the first grapheme by sliding the first graphemes sequence 314. In this case, the first graphemes sequence 314 is selected by using the touch screen for precise movement. During this process, the first graphemes sequence 314 may not be released. In this case, the processing apparatus 249 may acquire in real time an instant speed of the user's sliding input along the touch screen, and synchronously slide the first graphemes sequence 314 according to the acquired instant speed of the sliding input.

Similarly, the processing apparatus 249 processing apparatus 249 is further configured to make a response to second sliding input of a user on the display 102, determine a sliding direction and sliding speed of the second sliding input, and then that sliding the second graphemes sequence along the sliding direction of the second sliding input by using the sliding speed of the second sliding input as an initial sliding speed is displayed on the display 102; and when the second graphemes sequence stops sliding, select from the second graphemes sequence a grapheme, which corresponds to a preset second grapheme selection position as the second graphemes sequence.

Further, the display provided in this embodiment of the present invention is further configured to highlight the first grapheme or highlight the second grapheme. To make the user clearly acquire or identify the selected first grapheme and second grapheme, according to this embodiment of the present invention, the display highlights the first grapheme or the second grapheme specifically by changing display factors of the first grapheme and the second grapheme, for example, highlighting the first grapheme and the second grapheme by changing display factors such as the color, size, shape, and illumination. In addition, this embodiment of the present invention also provide another manner for highlighting the first grapheme or the second grapheme, that is, highlighting the first grapheme at the first grapheme selection position by using the display 102 or highlighting the first grapheme around the first grapheme selection position in a tip balloon way by using the display 102; meanwhile, highlighting the second grapheme at the second grapheme selection position by using the display 102 or highlighting the second grapheme around the second grapheme selection position in a tip balloon way by using the display 102.

Further, in a manner for improving the user operation experience provided in this embodiment of the present invention, when the display 102 highlights the first grapheme, the processing apparatus 249 processing apparatus 249 proportionally or exponentially scales down unselected graphemes from the close to the distant according to a distance between each of the unselected graphemes, except the selected first grapheme, and the selected first grapheme in the first graphemes sequence, and displays, on the display 102, the unselected and proportionally or exponentially scaled-down graphemes in the first graphemes sequence; and when the display 102 highlights the second grapheme, the processing apparatus 249 processing apparatus 249 proportionally or exponentially scales down the unselected graphemes from the close to the distant according to a distance between each of the unselected graphemes, except the selected second grapheme, and the selected second grapheme in the second graphemes sequence, and displays, on the display 102, the unselected and proportionally or exponentially scaled-down graphemes in the second graphemes sequence.

In the manner for improving the user operation experience provided in this embodiment of the present invention, the unselected graphemes in the first and second graphemes sequences is proportionally scaled down according to distances between the unselected graphemes in the first and second graphemes sequences and the corresponding selected first and second graphemes so that the selected graphemes are highlighted. In this manner, the user is capable of conveniently identifying the selected first and second graphemes, which improves the user experience quality.

Further, based on selecting the first grapheme and the second grapheme by using the sliding manner, this embodiment of the present invention further includes: when the sliding the first graphemes sequence along the sliding direction of the first sliding input by using the sliding speed of the first sliding input as an initial sliding speed is displayed on the display 102, processing apparatus 249 is further configured to gradually reduce the sliding speed of the first graphemes sequence in a constant damping way or an increasing damping way, and display the speed reduction status of the first graphemes sequence in the constant damping or increasing damping way; or when the sliding the second graphemes sequence along the sliding direction of the second sliding input by using the sliding speed of the second sliding input as an initial sliding speed is displayed on the display 102, the processing apparatus 249 processing apparatus 249 is further configured to gradually reduce the sliding speed of the second graphemes sequence in the constant damping way or increasing damping way, and display the speed reduction status of the second graphemes sequence in the constant damping or increasing damping way.

In the above processing manner, the sliding first graphemes sequence and second graphemes sequence may stop automatically after sliding for a period of time so that the user may view the current sliding status of the first graphemes sequence or the second graphemes sequence in time, thus improving the user experience quality.

Further, based on selecting the first grapheme and the second grapheme by using the sliding manner, this embodiment of the present invention further includes: the processing apparatus 249 processing apparatus 249 is further configured to determine whether the sliding speed of the first graphemes sequence is greater than a preset speed threshold, and instruct the display 102 to suspend the highlighting of the grapheme, which corresponds to the first grapheme selection position and is in the first graphemes sequence, when the sliding speed of the first grapheme is greater than the preset speed threshold; or the processing apparatus 249 processing apparatus 249 is further configured to determine whether the sliding speed of the second graphemes sequence is greater than a preset speed threshold, and when the sliding speed of the second grapheme is greater than the preset speed threshold, instruct the display 102 to suspend the highlighting of the grapheme, which corresponds to the second grapheme selection position and is in the second graphemes sequence.

In the technical solution provided in this embodiment of the present invention, it is determined, by comparing the first graphemes sequence or the second graphemes sequence with a preset speed threshold, whether to highlight the first grapheme or the second grapheme, that is, highlighting the grapheme, which corresponds to the first grapheme selection position and is in the first graphemes sequence, or the grapheme, which corresponds to the second grapheme selection position and is in the second graphemes sequence. When the sliding speed is higher than the preset speed threshold, it may indicate that a user's expected first grapheme or second grapheme is far from the first grapheme selection position or the second grapheme selection position. In this case, it is not necessary to highlight each grapheme passing through the first grapheme selection position or the second grapheme selection position, which therefore reduces the processing load of the processor or the display, saves the processing resources, improves the processing efficiency, and enhances the user experience.

Further, the mobile terminal 100 provided in this embodiment of the present invention may display the first graphemes sequence and the second graphemes sequence at the same position. To be specific, the first graphemes sequence is displayed at a first display position on the display and the second graphemes sequence is displayed at a second display position on the display; when the first graphemes sequence is displayed, the second graphemes sequence is hidden; and when the second element sequence is displayed, the first graphemes sequence is hidden. Specifically, the display may be implemented by the display 102. To be specific, the display 102 displays the first graphemes sequence at the first display position and displays the second graphemes sequence at the second display position, where the first display position and the second display position overlap. First, the display displays the first graphemes sequence by default, and when the processing apparatus 249 receives the second input of the user, the display 102 hides the first graphemes sequence and displays the second graphemes sequence at the second display position overlapping the first display position.

In the technical solution provided in this embodiment of the present invention, the first graphemes sequence and the second graphemes sequence are displayed at the first display position and the second display position that overlap each other, so as to save display space of the display 102 of the mobile terminal. In addition, display conversion between the first graphemes sequence and the second graphemes sequence is started when the processor receives the second input, so that the interaction interface generated on the mobile terminal is simple, thus improving display efficiency and enhancing the user experience quality.

Further, the mobile terminal 100 provided in this embodiment of the present invention may also display the first graphemes sequence and the second graphemes sequence at different positions. To be specific, the first graphemes sequence is displayed at the first display position on the display, the second graphemes sequence is displayed at the second display position on the display, and the first display position and the second display position do not overlap. Specifically, the display may be implemented by the display 102. To be specific, the display 102 displays the first graphemes sequence and the second graphemes sequence at different display positions. To make the user clearly distinguish the first graphemes sequence from the second graphemes sequence, the first graphemes sequence and the second graphemes sequence may be arranged along two vertical dimensions, and the arrangement direction of the first graphemes sequence is vertical to, or forms a 90° angle with, the arrangement direction of the second graphemes sequence. It may be understood that a sufficient distance between the first graphemes sequence and the second graphemes sequence also enables the user to differentiate the two graphemes sequences. For example, the first graphemes sequence is displayed at the top of the display, and the second graphemes sequence is displayed at the bottom of the display; or the first graphemes sequence is displayed on the left side of the display, and the second graphemes sequence is displayed on the right side of the display. In addition, to ensure that the positions of the first graphemes sequence and the second graphemes sequence satisfy user preferences, the first graphemes sequence and the second graphemes sequence may be customized according to user preferences. To be specific, the display positions of the first graphemes sequence and the second graphemes sequence may be changed or be set at different positions on the display according to user requirements.

To enable the user to quickly learn the contact searching function of the mobile terminal 100 provided in this embodiment of the present invention, the display 102, by displaying the first graphemes sequence 314 and the second graphemes sequence 316 at different positions, teaches or instructs the user, in a vivid presentation way, to quickly select the corresponding grapheme by using the displayed first graphemes sequence 314 and second graphemes sequence 316 in order to quickly search out a target contact. In this manner, the complexity of operations for contact searching by using the mobile terminal 100 is reduced and the user experience quality is improved.

Further, in the mobile terminal 100 provided in the embodiments of the present invention, the first graphemes sequence displayed on the display 102 includes only the first grapheme in the graphemes forming the first unit character of a recorded contact label, where the same first grapheme appears only once in the first graphemes sequence; the second graphemes sequence displayed on the display includes only the first grapheme in the graphemes forming the second unit character of the recorded contact label, where the same second grapheme appears only once in the second graphemes sequence; or the second graphemes sequence includes only the first grapheme in the graphemes forming the second unit character of a contact label having the first grapheme, where the same first grapheme appears only once in the second graphemes sequence.

In this embodiment of the present invention, the first graphemes sequence and the second graphemes sequence include only the first graphemes in the graphemes forming the first unit character of the recorded contact label, where the same first grapheme appears only once in the first graphemes sequence and the second graphemes sequence. That is, the first graphemes sequence and the second graphemes sequence are generated according to the contact labels in the contact information stored in the memory 250. Therefore, the first graphemes sequence and the second graphemes sequence do not include extra graphemes, that is, do not include unrecorded first graphemes. The first grapheme refers to the first grapheme in the elements forming the first unit character of the contact label. In this manner, the first graphemes sequence appears simple and occupies fewer resources, thereby improving user experience. Alternatively, to improve the search efficiency, the second graphemes sequence includes only the first grapheme in the graphemes forming the second unit character of the contact label having the first grapheme, where the same second grapheme appears only once in the second graphemes sequence. This solution is directed to allowing the user, when using the mobile terminal 100 provided in this embodiment of the present invention to search for a contact, to obtain, through filtering, a contact label having the first grapheme according to the grapheme selected by the first input. In this case, the second graphemes sequence may include only the first grapheme in the graphemes forming the second unit character of the contact label including the first grapheme. In other words, the second graphemes sequence is selected from the graphemes included in a contact label subset defined by the first grapheme selected by the first input. This may further narrow down a search scope for selecting the second grapheme, improves the search speed, reduces the load and resources of the processor, and enhances the user experience quality.

Further, in the mobile terminal 100 provided in this embodiment of the present invention, the display 102 is further configured to generate a contact sequence including contact information of the contact label matched with the first grapheme and the second grapheme according to a search result of the processing apparatus 249, which specifically includes:

the display 102 loads the contact label matched with the first grapheme and the second grapheme and contact information that corresponds to the contact label matched with the first grapheme and the second grapheme to a preset contact information presentation template, and displays the contact information presentation template loaded with the contact label matched with the first grapheme and the second grapheme and the contact information that corresponds to the contact label matched with the first grapheme and the second grapheme, so as to form the contact sequence. Specifically, the displaying, by the display 102, the contact information presentation template loaded with the contact label matched with the first grapheme and the second grapheme and the contact information that corresponds to the contact label matched with the first grapheme and the second grapheme so as to form the contact sequence includes:

the display 102 displays, in a staggered overlay way, the contact information presentation template loaded with the contact label matched with the first grapheme and the second grapheme and the contact information that corresponds to the contact label matched with the first grapheme and the second grapheme so as to form the contact sequence; or the display 102 displays, in a ring or fan arrangement way, the contact information presentation template loaded with the contact label matched with the first grapheme and the second grapheme and the contact information that corresponds to the contact label matched with the first grapheme and the second grapheme so as to form the contact sequence; or the display 102 displays, in a way of different sizes and depths, the contact information presentation template loaded with the contact label matched with the first grapheme and the second grapheme and the contact information that corresponds to the contact label matched with the first grapheme and the second grapheme, where a front contact information presentation template is displayed in a way of a maximum size and full definition while other contact information presentation templates are displayed in a gradual fading way according to the depths that increase gradually, so that the contact sequence is formed.

In the above technical solution provided in this embodiment of the present invention, the display 102 may load, according a preset setting manner, the contact information that is searched out and corresponds to the contact label matched with the first grapheme and the second grapheme, to a preset contact information presentation template, and display the contact information presentation template on the display. The presented contact sequence is more customized by using the preset presentation template to bear the contact information that is searched out, satisfying customized user requirements and improving the user experience quality.

An embodiment of the present invention further provides a contact searching method 400 applied to the mobile terminal 100. The contact searching method provided in this embodiment of the present invention refers to a specific process of contact searching performed by the mobile terminal 100 provided by the embodiment of the present invention.

Figure 4:
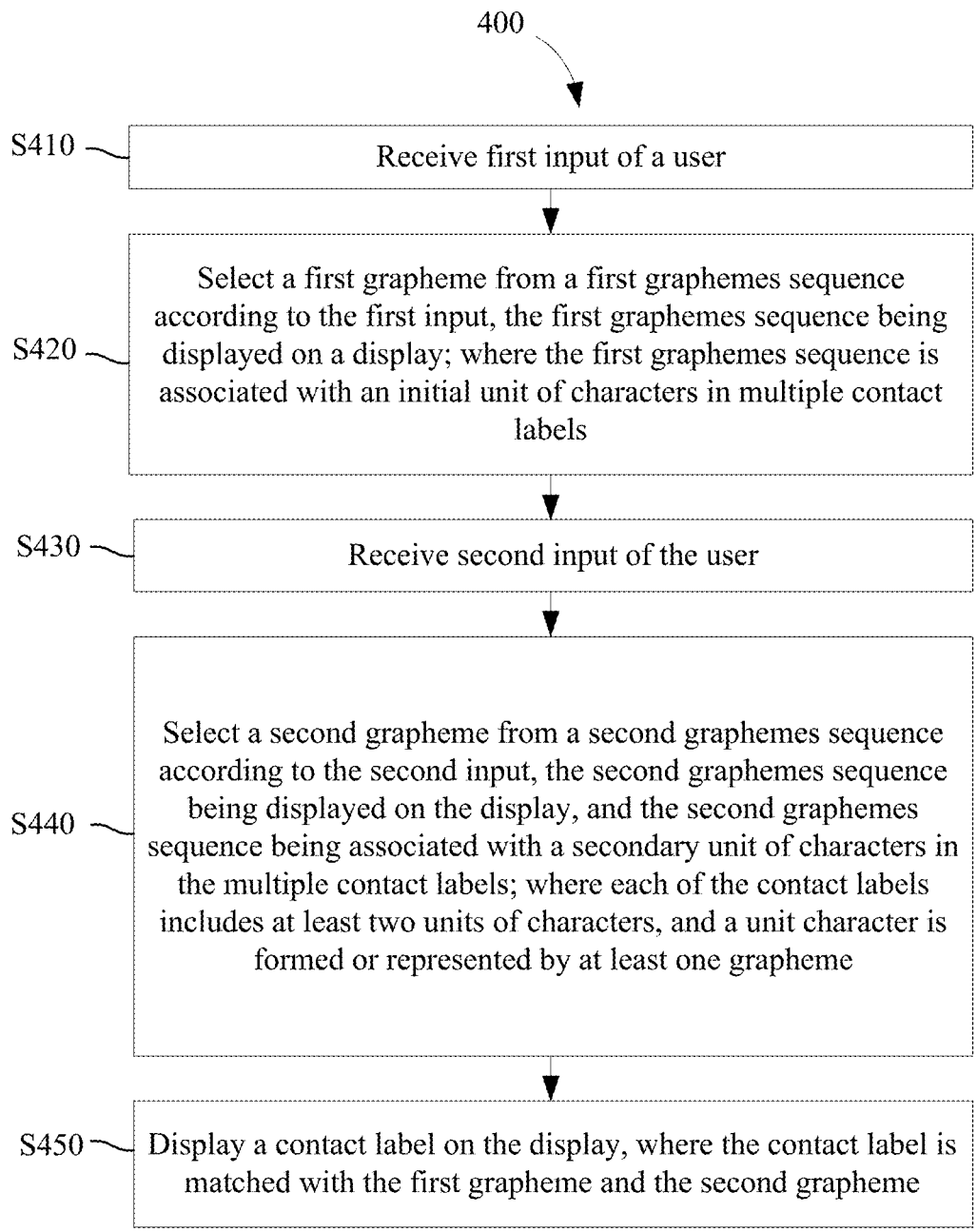

Referring to FIG. 4, the contact searching method 400 provided in this embodiment of the present invention specifically includes:

S410: Receive first input of a user.

S420: Select a first grapheme from a first graphemes sequence according to the first input, the first graphemes sequence being displayed on a display; where the first graphemes sequence is associated with an initial unit of characters in multiple contact labels.

S430: Receive second input of the user.

S440: Select a second grapheme from a second graphemes sequence according to the second input, the second graphemes sequence being displayed on the display, and the second graphemes sequence being associated with a secondary unit of characters in the multiple contact labels; where each of the contact labels includes at least two units of characters, and a unit character is formed or represented by at least one grapheme.

S450: Search for and display a contact label on the display, where contact label is matched with the first grapheme and the second grapheme.

For quickly searching out a contact, the memory 250 of the mobile terminal 100 stores the contact information, where the contact information generally has fixed information content and the information content generally includes: a contact label, a contact address, a contact phone number, a contact email address, a contact fax, a contact photo, a contact gender, and so on. The information content is generally stored in the memory 250 in a certain format. Generally, the contact label is an identifiable identifier that is most commonly used for the user to differentiate contacts and search for a contact, for example, the name of a contact, but not limited to the name of the contact. In some application scenarios, another expression manner may also be used as the contact label, for example, a pictogram, a text, or a similar expression manner. In this embodiment of the present invention, the contact label includes at least two units of characters. Setting at least two units of characters in the contact label aims to ensure that the contact label satisfies a common setting manner of the name of the contact. To be specific, generally the name of the contact includes two parts, that is, a given name and a family name. The unit character is an identifiable syntax unit formed and represented by at least one grapheme or formed or represented, in a certain rule, by multiple graphemes. The wording "form" refers to that the unit character is directly formed by combining the graphemes. The wording "represent" refers to that the unit character is not directly formed by the graphemes but indicated by the graphemes indirectly. For example, a Chinese character may be represented by the Pinyin or stokes corresponding to the Chinese character. The grapheme refers to a minimum composition unit or element, which cannot be segmented, for forming or representing the unit character. Specifically, when the unit character is a Chinese character, correspondingly, the graphemes are Pinyin letters corresponding to the Chinese character; or when the unit character is a word, correspondingly, the grapheme is the first letter in letters forming the word, where the word refers to a minimum semantic unit that has a definite meaning and is formed by one or multiple letters through a letter word formation manner. It may be understood that a Chinese character may be searched for by using Pinyin, or strokes, for example, Wubi (a Chinese character input method). Therefore, when the unit character is a Chinese character, correspondingly, the grapheme may be a stroke forming the Chinese character.

In the contact searching method provided in this embodiment of the present invention, the first graphemes sequence and the second graphemes sequence are displayed on the display so that the user is capable of quickly searching out a desired contact by using a combined searching manner, thus improving contact search efficiency and user experience on the mobile terminal.

Further, in the contact searching method 400 provided in this embodiment of the present invention, the contact label matched with the first grapheme and the second grapheme specifically refers to that the first grapheme is the first grapheme in the graphemes forming or representing the first unit character of each of the contact labels, the second grapheme is the first grapheme in the graphemes forming or representing the second unit character of each of the contact labels, and the second unit character follows the first unit character.

For convenient use of the contact searching method 400 provided in this embodiment of the present invention during the contact searching process, and better accommodation of a user operation preference, the first grapheme and the second grapheme are included in the graphemes forming the multiple unit characters of the contact label, and in addition, the first grapheme is the first grapheme in the graphemes forming or representing the first unit character of each of the contact labels, the second grapheme is the first grapheme in the graphemes forming or representing the second unit character of each of the contact labels, and the second unit character follows the first unit character. To be specific, the first grapheme and the second grapheme are only searched for and compared in the first graphemes included in the first unit character and the second unit character that form the contact label. This narrows down a search scope for searching for a corresponding contact label and therefore improves the searching efficiency. In addition, the user is generally familiar with the first grapheme in the graphemes included in the unit characters of the contact labels. Therefore, such an operation manner better accommodates a user operation preference.

Further, the contact searching method 400 provided in this embodiment of the present invention may be applicable to a mobile terminal having a touch screen display. Correspondingly, in the contact searching method 400, step S410, that is, receiving first input of a user, specifically includes:

receiving first sliding input of the user on the display, and determining a sliding direction and sliding speed of the first sliding input; and correspondingly, step S420, that is, the selecting a first grapheme from a first graphemes sequence according to the first input, includes:

sliding the first graphemes sequence along the sliding direction of the first sliding input by using the sliding speed of the first sliding input as an initial sliding speed; and when the first graphemes sequence stops sliding, selecting a grapheme, which corresponds to a preset first grapheme selection position and is in the first graphemes sequence, as the first grapheme.

When the contact searching method provided in this embodiment of the present invention is implemented on a mobile terminal having a touch screen display, as shown in FIG. 3, grapheme selection from the first graphemes sequence 314 and the second graphemes sequence 316 by adopting a touch manner may generally be implemented by directly clicking a corresponding grapheme. However, considering the probability that such a directly-clicking manner may cause mal-operation, the contact searching apparatus provided in this embodiment of the present invention selects the first grapheme and the second grapheme by sliding the first graphemes sequence 314 and the second graphemes sequence 316. To be specific, the processor makes a response to the first sliding input of the user, and determines the sliding direction and sliding speed of the first sliding input, and then slides the first graphemes sequence along the sliding direction of the first sliding input by using the sliding speed of the first sliding input as an initial sliding speed; and when the first graphemes sequence stops sliding, selects the grapheme, which corresponds to the preset first grapheme selection position and is in the first graphemes sequence, as the first grapheme, where the preset first grapheme selection position is a default position or a position specified according to user requirements; for example, a specific position mark is set on the display 102, and a grapheme at the position corresponding to the mark is selected as the first grapheme. The sliding the first graphemes sequence 314 by using the sliding speed of the first sliding input as an initial sliding speed enables the sliding of the first graphemes sequence 314 to meet the user expectation. For example, the user may slide the first graphemes sequence 314 at different sliding speeds according to the position of an expected grapheme in the first graphemes sequence 314, thus realizing the goal of selecting a desired grapheme from the first graphemes sequence 314 quickly. For example, when the expected grapheme is the last grapheme in the first graphemes sequence 314, the user may slide the first graphemes sequence at a higher speed; when the expected grapheme is a relative front grapheme, the user may slide the first graphemes sequence 314 at a lower speed in case that a high speed sliding causes the expected grapheme goes beyond the first grapheme selection position. When the first graphemes sequence stops sliding, the grapheme, which corresponds to the preset first grapheme selection position and is in the first graphemes sequence, is selected as the first grapheme. Alternatively, in the present invention, the manner for selecting the first grapheme is not limited to the above manner. In the above operation manner, after an operator assigns an initial sliding speed for the first graphemes sequence 314, the first graphemes sequence 314 may slide at the assigned initial sliding speed. During the sliding process of the first graphemes sequence 314, the user does not intervene the sliding of the first graphemes sequence 314. However, in some scenarios, the user needs to precisely select the first grapheme by sliding the first graphemes sequence 314. In this case, the first graphemes sequence 314 is selected by using the touch screen for precise movement. During this process, the first graphemes sequence 314 may not be released. In this case, the processing apparatus 249 may acquire in real time an instant speed of the user's sliding input along the touch screen, and synchronously slide the first graphemes sequence 314 according to the acquired instant speed of the sliding input.

Similarly, in the contact searching method 400 provided in this embodiment of the present invention, step S430, that is, receiving second input of the user, specifically includes:

receiving second sliding input of the user on the display, and determining a sliding direction and sliding speed of the second sliding input; and correspondingly, step S440, that is, selecting a second grapheme from a second graphemes sequence according to the second input, includes:

sliding the second graphemes sequence along the sliding direction of the second sliding input by using the sliding speed of the second sliding input as an initial sliding speed; and selecting a grapheme, which corresponds to a preset second grapheme selection position and is in the second graphemes sequence, as the second grapheme.

Figure 4A:
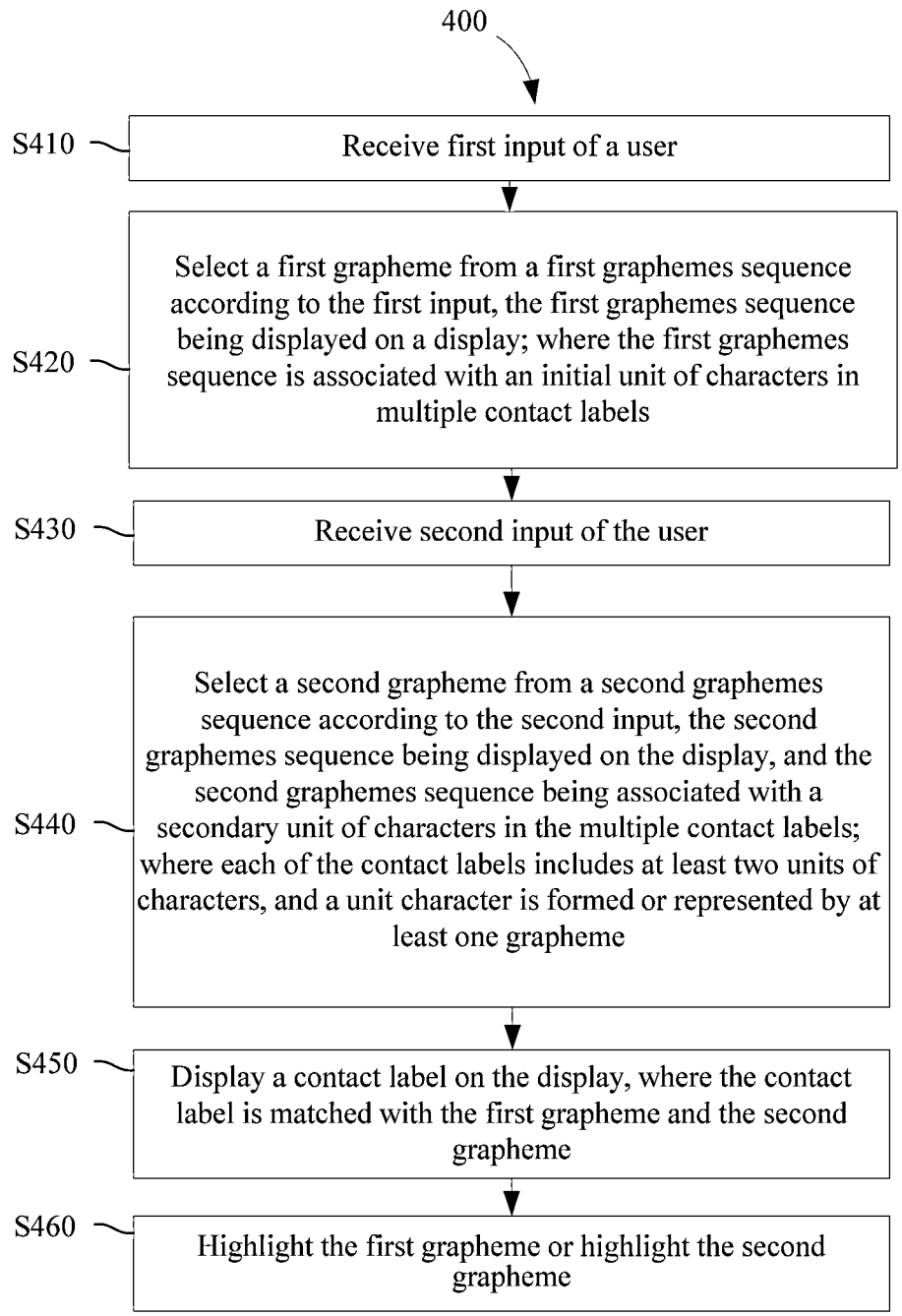

Further, referring to FIG. 4a, the contact searching method 400 provided in this embodiment of the present invention further includes:

S460: Highlight the first grapheme or highlight the second grapheme.

To make the user clearly acquire or identify the selected first grapheme and second grapheme, the contact searching method 400 provided in this embodiment of the present invention further includes highlighting the first grapheme or the second grapheme. Specifically, the first grapheme and the second grapheme are highlighted by changing display factors of the first grapheme and the second grapheme, for example, changing display factors such as the color, size, shape, and illumination. In addition, this embodiment of the present invention also provide another manner for highlighting the first grapheme or the second grapheme, that is, highlighting the first grapheme at the first grapheme selection position or highlighting the first grapheme around the first grapheme selection position in a tip balloon way; meanwhile, highlighting the second grapheme at the second grapheme selection position or highlighting the second grapheme around the second grapheme selection position in a tip balloon way.

Further, referring to FIG. 4b, based on selecting the first grapheme and the second grapheme by using the sliding manner, the contact searching method 400 provided in this embodiment of the present invention further includes:

S470: When highlighting the first grapheme, proportionally or exponentially scale down the unselected graphemes from the close to the distant according to a distance between each of the unselected graphemes except the selected first grapheme and the selected first grapheme in the first graphemes sequence; and S480: When highlighting the second grapheme, proportionally or exponentially scale down the unselected graphemes from the close to the distant according to a distance between each of the unselected graphemes except the selected second grapheme and the selected second grapheme in the second graphemes sequence.

In the method provided in this embodiment of the present invention, the unselected graphemes in the first and second graphemes sequences is proportionally scaled down according to distances between the unselected graphemes, which are in the first and second graphemes sequences, and the corresponding selected first and second graphemes, so that the selected graphemes are highlighted. In this manner, the user is capable of conveniently identifying the selected first and second graphemes, which improves the user experience quality.

Further, referring to FIG. 5, based on selecting the first grapheme and the second grapheme by using the sliding manner, the contact searching method 400 provided in this embodiment of the present invention further includes:

S500: When sliding the first graphemes sequence along the sliding direction of the first sliding input by using the sliding speed of the first sliding input as an initial sliding speed, gradually reduce the sliding speed of the first graphemes sequence in a constant damping way or increasing damping way; or S510: When sliding the second graphemes sequence along the sliding direction of the second sliding input by using the sliding speed of the second sliding input as an initial sliding speed, gradually reduce the sliding speed of the second graphemes sequence in a constant damping way or increasing damping way.

In the above method provided in this embodiment of the present invention, the sliding first graphemes sequence and second graphemes sequence may stop automatically after sliding for a period of time so that the user may view the current sliding status of the first graphemes sequence or the second graphemes sequence in time, thus improving the user experience quality.

Figure 5A:
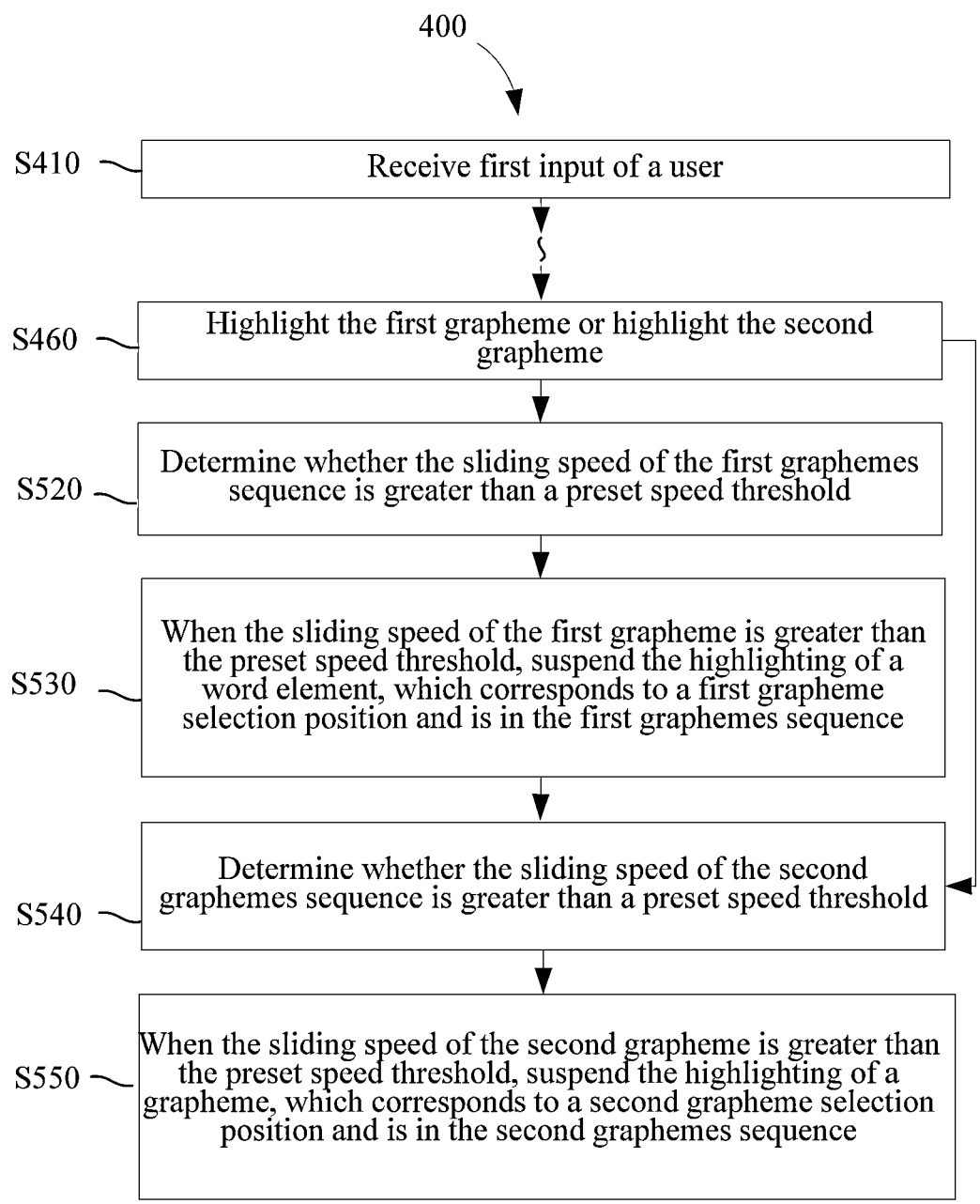

Further, referring to FIG. 5a, based on selecting the first grapheme and the second grapheme by using the sliding manner, the contact searching method 400 provided in this embodiment of the present invention further includes:

S520: Determine whether the sliding speed of the first graphemes sequence is higher than a preset speed threshold; and S530: When the sliding speed of the first grapheme is higher than the preset speed threshold, suspend the highlighting of the grapheme, which corresponds to the first grapheme selection position and is in the first graphemes sequence; or S540: Determine whether the sliding speed of the second graphemes sequence is higher than a preset speed threshold; and S550: When the sliding speed of the second grapheme is higher than the preset speed threshold, suspend the highlighting of the grapheme, which corresponds to the second grapheme selection position and is in the second graphemes sequence.

In the above method provided in this embodiment of the present invention, it is determined, by comparing the first graphemes sequence or the second graphemes sequence with a preset speed threshold, whether to highlight the first grapheme or the second grapheme, that is, highlighting the grapheme, which corresponds to the first grapheme selection position and is in the first graphemes sequence, or the grapheme, which corresponds to the second grapheme selection position and is in the second graphemes sequence. When the sliding speed is higher than the preset speed threshold, it indicates that a user's expected first grapheme or second grapheme is far from the first grapheme selection position or the second grapheme selection position. In this case, it is not necessary to highlight each grapheme passing through the first grapheme selection position or the second grapheme selection position, which therefore reduces the processing load of the processor or the display, saves the processing resources, improves the processing efficiency, and enhances the user experience.

Further, in the contact searching method 400 provided in this embodiment of the present invention, the first graphemes sequence is displayed at a first display position on the display and the second graphemes sequence is display at a second display position on the display; when the first graphemes sequence is displayed, the second graphemes sequence is hidden; and when the second graphemes sequence is displayed, the first graphemes sequence is hidden.

In the technical solution provided in this embodiment of the present invention, the first graphemes sequence and the second graphemes sequence are displayed at the first display position and the second display position that overlap each other, so as to save display space. In addition, display conversion between the first graphemes sequence and the second graphemes sequence is started when the user input the second input so that the interaction interface generated on the mobile terminal is simple, thus improving display efficiency and enhancing the user experience quality.

Further, in the contact searching method 400 provided in this embodiment of the present invention, the first graphemes sequence is displayed at the first display position on the display and the second graphemes sequence is displayed at the second display position on the display; where the first display position and the second display position do not overlap. To make the user clearly distinguish the first graphemes sequence from the second graphemes sequence, the first graphemes sequence and the second graphemes sequence may be arranged along two vertical dimensions, and the arrangement direction of the first graphemes sequence is vertical to, or forms a 90° angle with, the arrangement direction of the second graphemes sequence. It may be understood that a sufficient distance between the first graphemes sequence and the second graphemes sequence also enables the user to differentiate the two graphemes sequences. For example, the first graphemes sequence is displayed at the top of the display, and the second graphemes sequence is displayed at the bottom of the display; or the first graphemes sequence is displayed on the left side of the display, and the second graphemes sequence is displayed on the right side of the display. In addition, to ensure that the positions of the first graphemes sequence and the second graphemes sequence satisfy user preferences, the first graphemes sequence and the second graphemes sequence may be customized according to user preferences. To be specific, the display positions of the first graphemes sequence and the second graphemes sequence may be changed or be set at different positions on the display according to user requirements.

To enable the user to quickly learn the contact searching method provided in this embodiment of the present invention, the first graphemes sequence and the second graphemes sequence is displayed at different positions on the display, so as to teach or instruct the user, in a vivid presentation way, to quickly select the corresponding grapheme by using the displayed first graphemes sequence and second graphemes sequence in order to quickly search out a target contact. In this manner, the complexity of learning the contact searching operations is reduced and the user experience quality is improved.

Further, in the contact searching method 400 provided in this embodiment of the present invention, the first graphemes sequence includes only the first grapheme in the graphemes forming the first unit character of a recorded contact label, where the same first grapheme appears only once in the first graphemes sequence; the second graphemes sequence includes only the first grapheme in the graphemes forming the second unit character of the recorded contact label, where the same second grapheme appears only once in the second graphemes sequence; or the second graphemes sequence includes only the first grapheme in the graphemes forming the second unit character of a contact label having the first grapheme, where the same first grapheme appears only once in the second graphemes sequence.

In this embodiment of the present invention, the first graphemes sequence and the second graphemes sequence include only the first graphemes in the graphemes forming the first unit character of the recorded contact label, where the same first grapheme appears only once in the first graphemes sequence and the second graphemes sequence. That is, the first graphemes sequence and the second graphemes sequence are generated according to the contact labels in the contact information stored in the memory 250. Therefore, the first graphemes sequence and the second graphemes sequence do not include extra graphemes, that is, do not include unrecorded first graphemes. The first grapheme refers to the first grapheme in the elements forming the first unit character of the contact label. In this manner, the first graphemes sequence appears simple and occupies fewer resources, thereby improving user experience. Alternatively, to improve the search efficiency, the second graphemes sequence includes only the first grapheme in the graphemes forming the second unit character of the contact label having the first grapheme, where the same second grapheme appears only once in the second graphemes sequence. This solution is directed to allowing the user, when using the mobile terminal 100 provided in this embodiment of the present invention to search for a contact, to obtain, through filtering, a contact label having the first grapheme according to the grapheme selected by the first input. In this case, the second graphemes sequence may include only the first grapheme in the graphemes forming the second unit character of the contact label including the first grapheme. In other words, the second graphemes sequence is selected from the graphemes included in the contact label subset defined by the first grapheme selected by the first input. This may further narrow down a search scope for selecting the second grapheme, improves the search speed, reduces the load and resources of the processor, and enhances the user experience quality.

Further, in the contact searching method 400 provided in this embodiment of the present invention, step S450, that is, displaying the contact label matched with the first grapheme and the second grapheme on the display, specifically includes:

loading the contact label matched with the first grapheme and the second grapheme and contact information that corresponds to the contact label matched with the first grapheme and the second grapheme to a preset contact information presentation template; and displaying the contact information presentation template loaded with the contact label matched with the first grapheme and the second grapheme and the contact information that corresponds to the contact label matched with the first grapheme and the second grapheme.

Specifically, the displaying, by the displaying module, the contact information presentation template loaded with the contact label matched with the first grapheme and the second grapheme and the contact information that corresponds to the contact label matched with the first grapheme and the second grapheme includes:

displaying, in a staggered overlay way, the contact information presentation template loaded with the contact label matched with the first grapheme and the second grapheme and the contact information that corresponds to the contact label matched with the first grapheme and the second grapheme; or displaying, in a ring or fan arrangement way, the contact information presentation template loaded with the contact label matched with the first grapheme and the second grapheme and the contact information that corresponds to the contact label matched with the first grapheme and the second grapheme; or displaying, in a way of different sizes and depths, the contact information presentation template loaded with the contact label matched with the first grapheme and the second grapheme and the contact information that corresponds to the contact label matched with the first grapheme and the second grapheme, where the front contact information presentation template is displayed in a way of maximum size and full definition while other contact information presentation templates are displayed in a gradual fading way according to the depths that increase gradually.

In the contact searching method 400, the contact information, which is searched out and corresponds to the contact label matched with the first grapheme and the second grapheme, is allowed to be loaded to a preset contact information presentation template, and the contact information presentation template is displayed on the display. The presented contact sequence is more customized by using the preset presentation template to bear the contact information that is searched out, satisfying customized user requirements and providing user experience quality.

Figure 6:
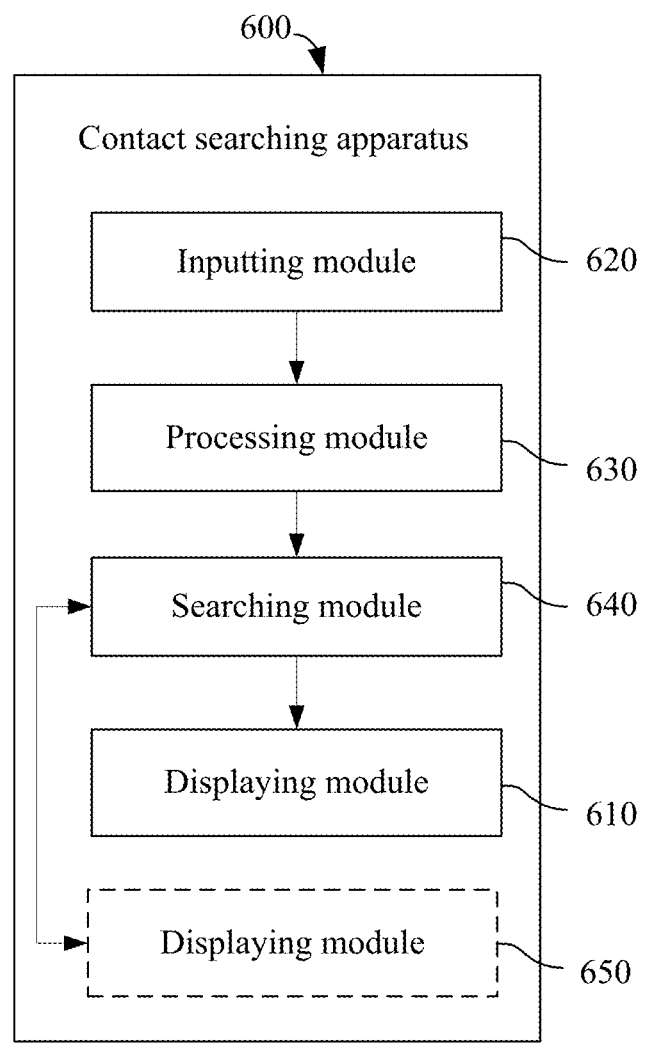
FIGS. 6, 6a, 6b, and 6c are schematic diagrams of multiple contact searching apparatuses according to embodiments of the present invention.

Referring to FIG. 6, a contact searching apparatus 600 provided in an embodiment of the present invention for performing the contact searching method includes a displaying module 610, an inputting module 620, a processing module 630, and a searching module 640.

The displaying module 610 is configured to display a first graphemes sequence and a second graphemes sequence.

The displaying module 610 should be understand as a combination including a display and hardware and software that control the display content and effect of the display; or the displaying module 610 includes various hardware and software resources that are needed for implementing the functions.

The inputting module 620 is configured to receive first input of and second input of a user.

The processing module 630 is configured to select a first grapheme from the first graphemes sequence according to the first input and select a second grapheme from the second graphemes sequence according to the second input; where the first graphemes sequence is associated with an initial unit of characters in multiple contact labels, the second graphemes sequence is associated with a secondary unit of characters in multiple contact labels, each of the contact labels includes at least two units of characters, and a unit character is formed or represented by at least one grapheme.

The searching module 640 is configured to search the contact information including the contact labels for a contact label associated with the first grapheme and the second grapheme.

The displaying module 610 is further configured to display the contact label matched with the first grapheme and the second grapheme searched for by the searching module 640.

For quickly searching out a contact, the user generally pre-stores the contact information in a readable memory, for example, the memory 250 of the mobile terminal. The contact information generally has fixed information content, where the information content generally includes: a contact label, a contact address, a contact phone number, a contact email address, a contact fax, a contact photo, a contact gender and so on. The information content is generally stored in the readable memory in a certain format. Generally, the contact label is an identifiable identifier most commonly used for the user to differentiate contacts and search for a contact, for example, the name of a contact, but not limited to the name of the contact. In some application scenarios, another expression manner may also be used as the contact label, for example, a pictogram, a text, or a similar expression manner. In this embodiment of the present invention, the contact label includes at least two units of characters. Setting at least two units of characters in the contact label aims to ensure that the contact label satisfies a common setting manner of the name of the contact. To be specific, generally the name of the contact includes two parts, that is, a given name and a family name. The unit character is an identifiable semantic unit formed or represented by at least one grapheme or formed or represented, in a certain rule, by multiple graphemes. The wording "form" refers to that the unit character is directly formed by combining the graphemes. The wording "represent" refers to that the unit character is not directly formed by the graphemes but indicated by the graphemes indirectly. For example, a Chinese character may be represented by the Pinyin or stokes corresponding to the Chinese character. Specifically, when the unit character is a Chinese character, correspondingly, the graphemes are a combination of Pinyin letters of the Chinese character; or when the unit character is a word, correspondingly, the grapheme is the first letter in letters forming the word, where the word refers to a minimum semantic unit that has a definite meaning and is formed by one or multiple letters through a letter word formation manner. It may be understood that a Chinese character may be searched for by using Pinyin, or strokes, for example, Wubi (a Chinese character input method). Therefore, when the unit character is a Chinese character, correspondingly, the grapheme may be a stroke forming the Chinese character. It may be understood that the contact searching apparatus 600 provided in this embodiment of the present invention may further include a storage module 650, where the storage module 650 is configured to store the contact information including the contact labels. That is, the contact information including the contact labels is stored in the storage module 650.

In the contact searching apparatus provided in this embodiment of the present invention, the processing module 610 displays the first graphemes sequence and the second graphemes sequence on the display so that the user is capable of quickly searching out a desired contact by using a combined searching manner, thus improving contact search efficiency and user experience on the mobile terminal Further, in the contact searching apparatus 600 provided in this embodiment of the present invention, the contact label matched with the first grapheme and the second grapheme specifically refers to that the first grapheme is the first grapheme in the graphemes forming or representing the first unit character of each of the contact labels, the second grapheme is the first grapheme in the graphemes forming or representing the second unit character of each of the contact labels, and the second unit character follows the first unit character.

In the contact searching apparatus 600 provided in this embodiment of the present invention, scopes of the graphemes included in the first graphemes sequence and the second graphemes sequence are restricted to narrow down a search scope for searching for a corresponding contact label in order to improve the search efficiency. In addition, the user is generally familiar with the first grapheme in the graphemes included in the unit characters of the contact labels. Therefore, such an operation manner better accommodates a user operation preference.

Figure 6A:
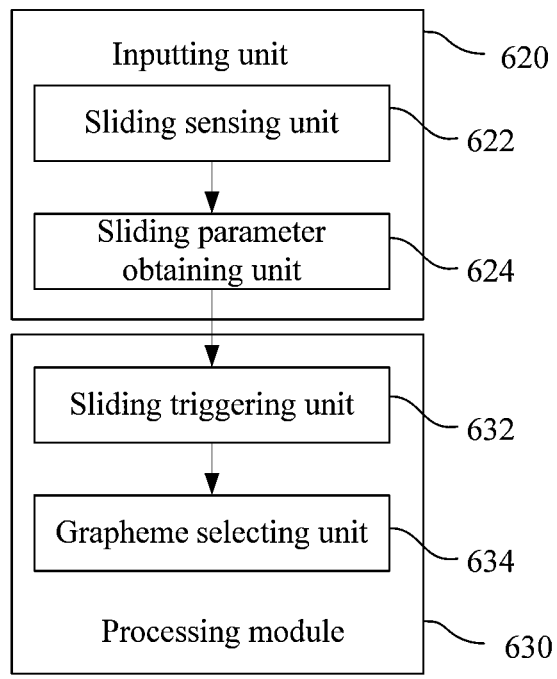

Further, referring to FIG. 6a, the contact searching apparatus provided in this embodiment of the present invention may include a touch screen display having a touch control function. Correspondingly, the inputting module 620 includes a sliding sensing unit 622 and a sliding parameter obtaining unit 624; and the processing module 630 includes a sliding triggering unit 632 and a grapheme selecting unit 634.

The sliding sensing unit 622 is configured to receive first sliding input of the user on the display.

The sliding parameter obtaining unit 624 is configured to determine a sliding direction and sliding speed of the first sliding input.

The sliding triggering unit 632 is configured to slide the first graphemes sequence along the sliding direction of the first sliding input by using the sliding speed of the first sliding input as an initial sliding speed.

The grapheme selecting unit 634 is configured to: when the first graphemes sequence stops sliding, select a grapheme, which corresponds to a preset first grapheme selection position and is in the first graphemes sequence, as the first grapheme.

When the contact searching apparatus provided in this embodiment of the present invention includes the touch screen display having the touch control function, as shown in FIG. 3, the first grapheme and the second grapheme may be selected by using a touch manner. Grapheme selection from the first graphemes sequence 314 and the second graphemes sequence 316 by using a touch manner may generally be implemented by directly clicking a corresponding grapheme. However, considering the probability that such a directly-clicking manner may cause mal-operation and the fact that the graphemes may not all be simultaneously displayed in a grapheme list on the display if the actual screen is not large enough, the contact searching apparatus provided in this embodiment of the present invention selects the first grapheme and the second grapheme by sliding the first graphemes sequence 314 and the second graphemes sequence 316. To be specific, the sliding sensing unit 622 detects the first sliding input of the user, and the sliding parameter determining unit determines the sliding direction and sliding speed of the first sliding input, and then the sliding triggering unit 632 slides the first graphemes sequence along the sliding direction of the first sliding input by using the sliding speed of the first sliding input as an initial sliding speed; when the first graphemes sequence stops sliding, the grapheme selecting unit 634 selects the grapheme corresponding to the preset first grapheme selection position from the first graphemes sequence as the first grapheme, where the preset first grapheme selection position is a default position or a position specified according to user requirements; for example, a specific position mark is set on the display 102, and a grapheme at the position corresponding to the mark is selected as the first grapheme. The sliding triggering unit 632 slides the first graphemes sequence 314 by using the sliding speed of the first sliding input as an initial sliding speed so that the sliding of the first graphemes sequence 314 meets the user expectation. For example, the user may slide the first graphemes sequence 314 at different sliding speeds according to the position of an expected grapheme in the first graphemes sequence 314, thus realizing the goal of selecting a desired grapheme from the first graphemes sequence 314 quickly. For example, when the expected grapheme is the last grapheme in the first graphemes sequence 314, the user may slide the first graphemes sequence at a higher speed; when the expected grapheme is a relative front grapheme, the user may slide the first graphemes sequence 314 at a lower speed in case that a high speed sliding causes the expected grapheme goes beyond the first grapheme selection position. When the first graphemes sequence stops sliding, the grapheme, which corresponds to the preset first grapheme selection position and is in the first graphemes sequence, is selected as the first grapheme. Alternatively, in the present invention, the manner for selecting the first grapheme is not limited to the above manner. In the above operation manner, after an operator assigns an initial sliding speed for the first graphemes sequence 314, the first graphemes sequence 314 may slide at the assigned initial sliding speed. During the sliding process of the first graphemes sequence 314, the user does not intervene the sliding of the first graphemes sequence 314. However, in some scenarios, the user needs to precisely select the first grapheme by sliding the first graphemes sequence 314. In this case, the first graphemes sequence 314 is selected by using the touch screen for precise movement. During this process, the first graphemes sequence 314 may not be released. In this case, the processing apparatus 249 may acquire in real time an instant speed of the user's sliding input along the touch screen, and synchronously slide the first graphemes sequence 314 according to the acquired instant speed of the sliding input.

Similarly, in the contact searching apparatus 600 provided in this embodiment of the present invention, the sliding sensing unit 622 is further configured to receive second sliding input of the user on the display;

the sliding parameter obtaining unit 624 is further configured to determine a sliding direction and sliding speed of the second sliding input;

the sliding triggering unit 632 is further configured to slide the second graphemes sequence along the sliding direction of the second sliding input by using the sliding speed of the second sliding input as an initial sliding speed; and the grapheme selecting unit 634 is further configured to: when the second graphemes sequence stops sliding, select a grapheme, which corresponds to a preset second grapheme selection position and is in the second graphemes sequence, as the second grapheme.

Further, in the contact searching apparatus 600 provided in this embodiment of the present invention, the displaying module 610 is further configured to highlight the first grapheme or highlight the second grapheme.

To make the user clearly acquire or identify the selected first grapheme and second grapheme, the displaying module 610 in the contact searching apparatus 600 provided in this embodiment of the present invention is further configured to highlight the first grapheme or the second grapheme. Specifically, the first grapheme and the second grapheme are highlighted by changing the display factors of the first grapheme and the second grapheme, for example, changing display factors such as the color, size, shape, and illumination. In addition, this embodiment of the present invention also provides another manner for highlighting the first grapheme or the second grapheme. To be specific, the displaying module 610 is further configured to highlight the first grapheme at the first grapheme selection position or the displaying module 610 is further configured to highlight the first grapheme around the first grapheme selection position in a tip balloon way. Similarly, the displaying module 610 is further configured to highlight the second grapheme at the second grapheme selection position, or the displaying module 610 is configured to highlight the second grapheme around the second grapheme selection position in a tip balloon way.

Further, in the contact searching apparatus 600 provided in this embodiment of the present invention, the displaying module 610 is further configured to: when highlighting the first grapheme, proportionally or exponentially scale down the unselected grapheme from the close to the distant according to a distance between each of the unselected graphemes except the selected first grapheme and the selected first grapheme in the first graphemes sequence; and the displaying module 610 is further configured to: when highlighting the second grapheme, proportionally or exponentially scale down the unselected graphemes from the close to the distant according to a distance between each of the unselected graphemes except the selected second grapheme and the selected second grapheme in the second graphemes sequence.

In the contact searching apparatus 600 provided in this embodiment of the present invention, the displaying module 610 proportionally scales down the unselected graphemes in the first and second graphemes sequences according to distances between the unselected graphemes in the first and second graphemes sequences and the corresponding selected first and second graphemes so that the selected graphemes are highlighted. Therefore, the user is capable of conveniently identifying the selected first and second graphemes, which improves the user experience quality.

Figure 6B:
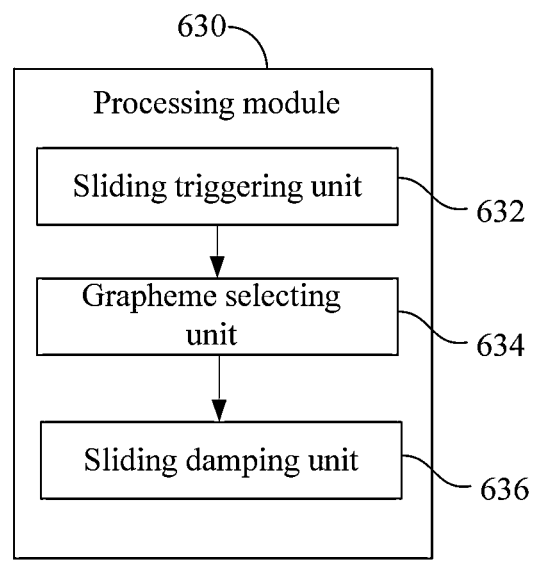

Further, referring to FIG. 6b, in the contact searching apparatus provided in this embodiment of the present invention, the processing module 630 further includes: a sliding damping unit 636, where the sliding damping unit 636 is configured to: when the sliding triggering unit 632 slides the first graphemes sequence along the sliding direction of the first sliding input by using the sliding speed of the first sliding input as an initial sliding speed, gradually reduce the sliding speed of the first graphemes sequence in a constant damping way or an increasing damping way. Or, the processing module 630 further includes: a sliding damping unit 636, where the sliding damping unit 636 is configured to: when the sliding triggering unit 632 slides the second graphemes sequence along the sliding direction of the second sliding input by using the sliding speed of the second sliding input as an initial sliding speed, gradually reduce the sliding speed of the second graphemes sequence in a constant damping way or an increasing damping way.

According to this embodiment of the present invention, in the processing module 630, the sliding damping unit 636 enables the sliding first graphemes sequence and second graphemes sequence to stop after sliding for a period of time so that the user may view the current sliding status of the first graphemes sequence or the second graphemes sequence so as to improve the user experience quality.

Figure 6C:
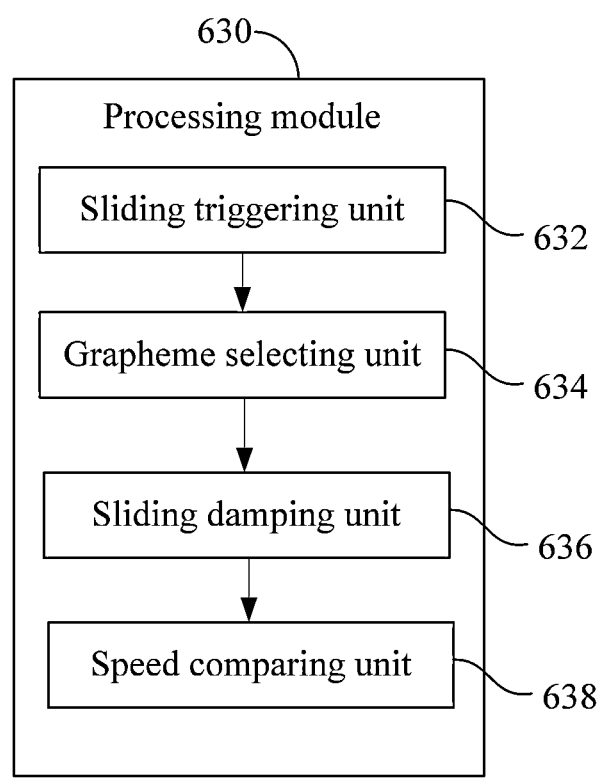

Further, referring to FIG. 6c, in the contact searching apparatus 600 provided in this embodiment of the present invention, the processing module 630 further includes a speed comparing unit 638, where the speed comparing unit 638 is configured to determine whether the sliding speed of the first graphemes sequence is higher than a preset speed threshold, and issue, when the sliding speed of the first grapheme is higher than the preset speed threshold, an instruction to instruct the displaying module 610 to suspend the highlighting of the grapheme, which corresponds to the first grapheme selection position and is in the first graphemes sequence; or the processing module 630 further includes a speed comparing unit 638, where the speed comparing unit 638 is configured to determine whether the sliding speed of the second graphemes sequence is higher than a preset speed threshold, and issue, when the sliding speed of the second grapheme is higher than the preset speed threshold, an instruction to instruct the displaying module 610 to suspend the highlighting of the grapheme, which corresponds to the second grapheme selection position and is in the second graphemes sequence.

In the contact searching apparatus 600 provided in this embodiment of the present invention, the displaying module 610 determines, by comparing the first graphemes sequence or the second graphemes sequence with a preset speed threshold, whether to highlight the first grapheme or the second grapheme, that is, highlighting the grapheme, which corresponds to the first grapheme selection position and is in the first graphemes sequence, or the grapheme, which corresponds to the second grapheme selection position and is in the second graphemes sequence. When the sliding speed is higher than the preset speed threshold, it indicates that a user's expected first grapheme or second grapheme is far from the first grapheme selection position or the second grapheme selection position. In this case, it is not necessary to highlight each grapheme passing through the first grapheme selection position or the second grapheme selection position, which therefore reduces the processing load of the processor or the display, saves the processing resources, improves the processing efficiency, and enhances the user experience.

Further, in the contact searching apparatus 600 provided in this embodiment of the present invention, the first graphemes sequence is displayed at a first display position on the display and the second graphemes sequence is display at a second display position on the display; where the first display position and the second display position overlap; when the first graphemes sequence is displayed, the second graphemes sequence is hidden; and when the second graphemes sequence is displayed, the first graphemes sequence is hidden. Specifically, the displaying module 610 displays the first graphemes sequence at the first display position on the display and displays the second graphemes sequence at the second display position on the display, where the first display position and the second display position overlay. During implementation, the first graphemes sequence and the second graphemes sequence are not displayed simultaneously. That is, when the first graphemes sequence is displayed, the second graphemes sequence is hidden; and when the second graphemes sequence is displayed, the first graphemes sequence is hidden. More specifically, when the contact searching apparatus provided in this embodiment of the present invention is used, the first graphemes sequence is displayed at the first display position at first by default. When receiving the second input of the user, the inputting module 620 issues an instruction to the displaying module 610 to instruct the displaying module 610 to hide the first graphemes sequence and display the second graphemes sequence at the second display position. The displaying the second graphemes sequence at the second display position specifically includes: when the selecting module 620 receives the second input of the user, hiding, by the displaying module 610, the first graphemes sequence, and displaying the second graphemes sequence at the second display position overlapping the first display position.

In the technical solution provided in this embodiment of the present invention, the first graphemes sequence and the second graphemes sequence are displayed at the first display position and the second display position that overlap each other, so as to save display space. In addition, display conversion between the first graphemes sequence and the second graphemes sequence is started when the user inputs the second input so that the interaction interface generated on the mobile terminal is simple, thus improving display efficiency and enhancing the user experience quality.

Further, in the contact searching apparatus 600 provided in this embodiment of the present invention, the first graphemes sequence is displayed at a first display position on the display and the second graphemes sequence is displayed at a second display position on the display; where the first display position and the second display position do not overlap. Specifically, the displaying module 610 displays the first graphemes sequence at the first display position on the display and displays the second graphemes sequence at the second display position on the display. The first display position and the second display position do not overlap. That is, the first graphemes sequence and the second graphemes sequence are displayed at different positions on the display respectively. To make the user clearly differentiate the first graphemes sequence from the second graphemes sequence, the first graphemes sequence and the second graphemes sequence may be arranged along two vertical dimensions, and the arrangement direction of the first graphemes sequence is vertical to, or forms a 90° angle with, the arrangement direction of the second graphemes sequence. It may be understood that a sufficient distance between the first graphemes sequence and the second graphemes sequence also enables the user to differentiate the two graphemes sequences. For example, the first graphemes sequence is displayed at the top of the display, and the second graphemes sequence is displayed at the bottom of the display; or the first graphemes sequence is displayed on the left side of the display, and the second graphemes sequence is displayed on the right side of the display. In addition, to ensure that the positions of the first graphemes sequence and the second graphemes sequence satisfy user preferences, the first graphemes sequence and the second graphemes sequence may be customized according to user preferences. To be specific, the display positions of the first graphemes sequence and the second graphemes sequence may be changed, or the first graphemes sequence and the second element sequence may be set at different positions on the display according to user requirements.

To enable the user to quickly learn the method of using the contact searching apparatus provided in this embodiment of the present invention, the displaying module 610, by displaying the first graphemes sequence and the second graphemes sequence at different positions on the display, teaches or instructs the user, in a vivid presentation way, to quickly select the corresponding grapheme by using the displayed first graphemes sequence and second graphemes sequence in order to quickly search out a target contact. In this manner, the complexity of learning the contact searching operations is reduced and the user experience quality is improved.

Further, in the contact searching apparatus 600 provided in this embodiment of the present invention, the first graphemes sequence includes only the first grapheme in the graphemes forming the first unit character of a recorded contact label, where the same first grapheme appears only once in the first graphemes sequence; the second graphemes sequence includes only the first grapheme in the graphemes forming the second unit character of the recorded contact label, where the same second grapheme appears only once in the second graphemes sequence; or the second graphemes sequence includes only the first grapheme in the graphemes forming the second unit character of a contact label having the first grapheme, where the same first grapheme appears only once in the second graphemes sequence.

In the contact searching apparatus provided in this embodiment of the present invention, the first graphemes sequence and the second graphemes sequence include only the first graphemes in the graphemes forming the first unit character of the recorded contact label, where the same first grapheme appears only once in the first graphemes sequence and the second graphemes sequence. That is, the first graphemes sequence and the second graphemes sequence are generated according to the contact labels in the contact information stored in the memory 250. Therefore, the first graphemes sequence and the second graphemes sequence do not include extra graphemes, that is, do not include unrecorded first graphemes. The first grapheme refers to the first grapheme in the elements forming the first unit character of the contact label. In this manner, the first graphemes sequence appears simple and occupies fewer resources, thereby improving user experience. Alternatively, to improve the search efficiency, the second graphemes sequence includes only the first grapheme in the graphemes forming the second unit character of the contact label having the first grapheme, where the same second grapheme appears only once in the second graphemes sequence. This solution is directed to allowing the user, when using the mobile terminal 100 provided in this embodiment of the present invention to search for a contact, to obtain, through filtering, a contact label having the first grapheme according to the grapheme selected by the first input. In this case, the second graphemes sequence may include only the first grapheme in the graphemes forming the second unit character of the contact label including the first grapheme. In other words, the second graphemes sequence is selected from the graphemes included in a contact label subset defined by the first grapheme selected by the first input. This may further narrow down a search scope for selecting the second grapheme, improves the search speed, reduces the load and resources of the processor, and enhances the user experience quality.

Further, in the contact searching apparatus 600 provided in this embodiment of the present invention, the displaying module 610 is configured to display the contact label matched with the first grapheme and the second grapheme on the display. The displaying module 610 loads the contact label matched with the first grapheme and the second grapheme and contact information that corresponds to the contact label matched with the first grapheme and the second grapheme to a preset contact information presentation template, and displays the contact information presentation template loaded with the contact label matched with the first grapheme and the second grapheme and the contact information that corresponds to the contact label matched with the first grapheme and the second grapheme.

Specifically, the displaying, by the displaying module 610, the contact information presentation template loaded with the contact label matched with the first grapheme and the second grapheme and the contact information that corresponds to the contact label matched with the first grapheme and the second grapheme includes:

the displaying module 610 displays, in a staggered overlay way, the contact information presentation template loaded with the contact label matched with the first grapheme and the second grapheme and the contact information that corresponds to the contact label matched with the first grapheme and the second grapheme; or the displaying module 610 displays, in a ring or fan arrangement way, the contact information presentation template loaded with the contact label matched with the first grapheme and the second grapheme and the contact information that corresponds to the contact label matched with the first grapheme and the second grapheme; or the displaying module 610 displays, in a way of different sizes and depths, the contact information presentation template loaded with the contact label matched with the first grapheme and the second grapheme and the contact information that corresponds to the contact label matched with the first grapheme and the second grapheme, where the front contact information presentation template is displayed in a way of a maximum size and full definition while other contact information presentation templates are displayed in a gradual fading way according to the depths.

In the contact searching apparatus 600, the displaying module 610 loads the contact information, which is searched out and corresponds to the contact label matched with the first grapheme and the second grapheme, to a preset contact information presentation template, and displays the contact information presentation template on the display. The presented contact sequence is more customized by using the preset presentation template to bear the contact information that is searched out, satisfying customized user requirements and providing the user experience quality.

Persons skilled in the art may understand that all or part of the steps of the methods according to the embodiments of the present invention may be implemented by hardware following instructions of programs. The program may be stored in a computer readable storage medium, in which the program, when being executed, performs the process of each method of the embodiments. The storage medium may be, for example, a magnetic disk, a CD-ROM, a read-only memory (Read-Only Memory, ROM) or a random access memory (Random Access Memory, RAM).

Specifically, an embodiment of the present invention provides a readable storage medium. The readable storage medium stores an executable instruction, and when being read by a computer unit, the executable instruction is capable of performing the contact searching method provided in the embodiment of the present invention. The contact searching method includes:

receiving first input of a user;

selecting a first grapheme from a first graphemes sequence according to the first input, the first graphemes sequence being displayed on a display; where the first graphemes sequence is associated with an initial unit of characters in multiple contact labels;

receiving second input of the user;

selecting a second grapheme from a second graphemes sequence according to the second input, the second graphemes sequence being displayed on the display, and the second graphemes sequence being associated with a secondary unit of characters in the multiple contact labels; where each of the contact labels includes at least two units of characters, and a unit character is formed or represented by at least one grapheme; and searching for and displaying a contact label on the display, where contact label is matched with the first grapheme and the second grapheme.

Further, in the contact searching method that is executed by the executable instructions stored in the readable storage medium, the contact label matched with the first grapheme and the second grapheme specifically refers to that the first grapheme is the first grapheme in the graphemes forming or representing the first unit character of each of the contact labels, the second grapheme is the first grapheme in the graphemes forming or representing the second unit character of each of the contact labels, and the second unit character follows the first unit character.

Further, in the contact searching method that is executed by the executable instructions stored in the readable storage medium, the unit character is a Chinese character, and correspondingly, the grapheme is the first letter in Pinyin letters corresponding to the Chinese character; or the unit character is a word, and correspondingly, the grapheme is the first letter in letters forming the word; or the unit character is a Chinese character, and correspondingly, the grapheme is the first stroke in strokes forming the Chinese character.

Further, in the contact searching method that is executed by the executable instruction stored in the readable storage medium, the receiving first input of a user further includes:

receiving first sliding input of the user on the display, and determining a sliding direction and sliding speed of the first sliding input; and correspondingly, the selecting a first grapheme from a first graphemes sequence according to the first input includes:

when the first graphemes sequence stops sliding, selecting a grapheme, which corresponds to a preset first grapheme selection position and is in the first graphemes sequence, as the first grapheme.

Further, in the contact searching method that is executed by the executable instruction stored in the readable storage medium, the receiving second input of the user further includes:

receiving second sliding input of the user on the display, and determining a sliding direction and sliding speed of the second sliding input; and correspondingly, the selecting a second grapheme from a second graphemes sequence according to the second input includes:

when the second graphemes sequence stops sliding, sliding the second graphemes sequence along the sliding direction of the second sliding input by using the sliding speed of the second sliding input as an initial sliding speed; and selecting a grapheme, which corresponds to a preset second grapheme selection position and is in the second graphemes sequence, as the second grapheme.

Further, the contact searching method that is performed by the executable instruction stored in the readable storage medium includes: highlighting the first grapheme or highlight the second grapheme.

Further, in the contact searching method that is executed by the executable instruction stored in the readable storage medium, the highlighting the first grapheme specifically includes:

highlighting the first grapheme at the first grapheme selection position, or highlighting the first grapheme around the first grapheme selection position in a tip balloon way; and the highlighting the second grapheme specifically includes:

highlighting the second grapheme at the second grapheme selection position, or highlighting the second grapheme around the second grapheme selection position in a tip balloon way.

Further, the contact searching method that is executed by the executable instruction stored in the readable storage medium includes: when highlighting the first grapheme, proportionally or exponentially scaling down the unselected graphemes from the close to the distant according to a distance between each of the unselected graphemes except the selected first grapheme and the selected first grapheme in the first graphemes sequence; and when highlighting the second grapheme, proportionally or exponentially scaling down the unselected graphemes from the close to the distant according to a distance between each of the unselected graphemes except the selected second grapheme and the selected second grapheme in the second graphemes sequence; and Further, the contact searching method that is executed by the executable instruction stored in the readable storage medium, when the first graphemes sequence is slid along the sliding direction of the first sliding input by using the sliding speed of the first sliding input as an initial sliding speed, further includes: gradually reducing the sliding speed of the first graphemes sequence in a constant damping way or an increasing damping way.

Further, the contact searching method that is executed by the executable instruction stored in the readable storage medium further includes:

determining whether the sliding speed of the first graphemes sequence is higher than a preset speed threshold; and when the sliding speed of the first grapheme is higher than the preset speed threshold, suspending the highlighting of the grapheme, which corresponds to the first grapheme selection position and is in the first graphemes sequence.

Further, the contact searching method that is executed by the executable instruction stored in the readable storage medium, when the second graphemes sequence is slid along the sliding direction of the second sliding input by using the sliding speed of the second sliding input as an initial sliding speed, further includes: gradually reducing the sliding speed of the second graphemes sequence in a constant damping way or an increasing damping way.

Further, the contact searching method that is executed by the executable instruction stored in the readable storage medium further includes:
    determining whether the sliding speed of the second graphemes sequence is higher than a preset speed threshold; and
    when the sliding speed of the second grapheme is higher than the preset speed threshold, suspending the highlighting of the grapheme, which corresponds to the second grapheme selection position and is in the second graphemes sequence.

Further, in the contact searching method that is executed by the executable instruction stored in the readable storage medium, the first graphemes sequence is displayed at a first display position on the display and the second graphemes sequence is display at a second display position on the display; where the first display position and the second display position overlap; when the first graphemes sequence is displayed, the second graphemes sequence is hidden; and when the second graphemes sequence is displayed, the first graphemes sequence is hidden.

Further, in the contact searching method that is executed by the executable instruction stored in the readable storage medium, the first graphemes sequence is displayed at a first display position on the display and the second graphemes sequence is displayed at a second display position on the display; where the first display position and the second display position do not overlap.

Further, in the contact searching method that is executed by the executable instructions stored in the readable storage medium, the first graphemes sequence includes only the first grapheme in the graphemes forming the first unit character of a recorded contact label, where the same first grapheme appears only once in the first graphemes sequence; the second graphemes sequence includes only the first grapheme in the graphemes forming the second unit character of the recorded contact label, where the same second grapheme appears only once in the second graphemes sequence; or the second graphemes sequence includes only the first grapheme in the graphemes forming the second unit character of a contact label having the first grapheme, where the same first grapheme appears only once in the second graphemes sequence.

Finally, it should be noted that the above embodiments are merely provided for describing the technical solutions of the present invention, but not intended to limit the present invention.

What is claimed is:

1. A method of facilitating combinational searching in a mobile terminal for a contact label, the method comprising:
    performing a listing of a first sequence of graphemes on a display of the mobile terminal;
    receiving a first input;
    performing a selection of a first grapheme from the first sequence of graphemes in response to the first input, the first sequence of graphemes being associated with a first unit of characters relating to a plurality of contact labels, each of the contact labels comprising at least two characters, and each of the at least two characters being represented by at least one grapheme;
    performing, on the display of the mobile terminal, a first display of a first set of contact labels being searched within the plurality of contact labels, if each of the first set of contact labels comprising a grapheme matching the first grapheme;
    performing a listing of a second sequence of graphemes on the display, wherein the first sequence of graphemes is listed at a first position of the display, the second sequence of graphemes is listed at a second position of the display, and the first sequence of graphemes is hidden when the second sequence of graphemes is listed;
    receiving a second input;
    performing a selection of a second grapheme from the second sequence of graphemes in response to the second input, the second sequence of graphemes being associated with a second unit of characters relating to the plurality of contact labels; and
    performing, on the display of the mobile terminal, an updated display of the first display, the updated display relating to a second set of contact labels being searched within the first set of contact labels, if each of the second set of contact labels comprising a grapheme matching the second grapheme.

2. The method according to claim 1, wherein the grapheme matching the first grapheme is in a first character in each of the first set of contact labels, and the grapheme matching the second grapheme is in a second character in each of the second set of contact labels.

3. The method according to claim 1, wherein each of the at least two characters is
    a Chinese character represented by a grapheme being the first stroke in strokes forming the Chinese character.

4. The method according to claim 1, further comprising:
    determining a sliding direction and a sliding speed in response to the first input, the selection of the first grapheme corresponding to the sliding direction and the sliding speed.

5. The method according to claim 1, further comprising:
    determining a sliding direction and a sliding speed in response to the second input, the selection of the second grapheme corresponding to the sliding direction and the sliding speed.

6. The method according to claim 4, wherein the first grapheme is selected by sliding the first sequence of graphemes along the sliding direction using the sliding speed as an initial sliding speed, and gradually reducing the sliding speed of the first sequence of graphemes.

7. The method according to claim 6, further comprising:
    when the sliding speed is lower than a preset speed threshold, highlighting the first grapheme in the first sequence of graphemes.

8. The method according to claim 5, wherein the second grapheme is selected by sliding the second sequence of graphemes along the sliding direction using the sliding speed as an initial sliding speed, and gradually reducing the sliding speed of the second sequence of graphemes.

9. The method according to claim 8, further comprising:
    when the sliding speed is lower than a preset speed threshold, highlighting the second grapheme in the second sequence of graphemes.

10. The method according to claim 1, wherein at least part of the first position overlapping with at least part of the second position, and the second sequence of graphemes is hidden when the first sequence of graphemes is listed.

11. The method according to claim 1, wherein the first sequence of graphemes is listed at a first position of the display and the second sequence of graphemes is listed at a second position of the display, and the first position does not overlap with the second position.

12. The method according to claim 1, wherein the first sequence of graphemes comprises distinct graphemes; and the second sequence of graphemes comprises distinct graphemes.

13. The method according to claim 1, wherein the first display is performed by loading contact information of the first set of contact labels to a preset presentation template.

14. The method according to claim 13, wherein the presentation template is arranged in one of the following ways: a staggered overlay way, a ring or a fan arrangement way, and
a front contact information is displayed in a way of a maximum size and full definition while other contact information is displayed in a gradual fading way.

15. A mobile terminal, comprising a memory, a display, and a processing apparatus, wherein
the memory is configured to store a plurality of contact labels, each of the contact labels comprising at least two characters, and each of the at least two characters being represented by at least one grapheme;
the display is configured to perform a listing of a first sequence of graphemes on the display;
the processing apparatus is configured to:
receive a first input; and
perform a selection of a first grapheme from the first sequence of graphemes in response to the first input, the first sequence of graphemes being associated with a first unit of characters relating to the plurality of contact labels;
the display is further configured to:
perform a first display of a first set of contact labels being searched within the plurality of contact labels, if each of the first set of contact labels comprising a grapheme matching the first grapheme;
perform a listing of a second sequence of graphemes on the display, wherein the first sequence of graphemes is listed at a first position of the display, the second sequence of graphemes is listed at a second position of the display, and the first sequence of graphemes is hidden when the second sequence of graphemes is listed;
the processing apparatus is further configured to:
receive a second input;
perform a selection of a second grapheme from the second sequence of graphemes in response to the second input, the second sequence of graphemes being associated with a second unit of characters relating to the plurality of contact labels; and
the display is further configured to:
perform an updated display of the first display, the updated display relating to a second set of contact labels being searched within the first set of contact labels, if each of the second set of contact labels comprising a grapheme matching the second grapheme.

16. The mobile terminal according to claim 15, wherein the grapheme matching the first grapheme is in a first character in each of the first set of contact labels, and the grapheme matching the second grapheme is in a second character in each of the second set of contact labels.

17. The mobile terminal according to claim 15, wherein each of the at least two characters is
a Chinese character represented by a grapheme being the first stroke in strokes forming the Chinese character.

18. The mobile terminal according to claim 15, wherein the processing apparatus is further configured to determine a sliding direction and a sliding speed in response to the first input, the selection of the first grapheme corresponding to the sliding direction and the sliding speed.

19. The mobile terminal according to claim 15, wherein the processing apparatus is further configured to determine a sliding direction and a sliding speed in response to the second input, the selection of the second grapheme corresponding to the sliding direction and the sliding speed.

20. The mobile terminal according to claim 18, wherein the first grapheme is selected by sliding the first sequence of graphemes along the sliding direction using the sliding speed as an initial sliding speed, and gradually reducing the sliding speed of the first sequence of graphemes.

21. The mobile terminal according to claim 20, wherein when the sliding speed is lower than a preset speed threshold, the display is further configured to highlight the first grapheme in the first sequence of graphemes.

22. The mobile terminal according to claim 18, wherein the second grapheme is selected by sliding the second sequence of graphemes along the sliding direction using the sliding speed as an initial sliding speed, and gradually reducing the sliding speed of the second sequence of graphemes.

23. The mobile terminal according to claim 22, wherein when the sliding speed is lower than a preset speed threshold, the display is further configured to highlight the second grapheme in the second sequence of graphemes.

24. The mobile terminal according to claim 15, wherein the second sequence of graphemes is hidden when the first sequence of graphemes is listed.

25. The mobile terminal according to claim 15, wherein the first sequence of graphemes is listed at a first position of the display and the second sequence of graphemes is listed at a second position of the display, and the first position does not overlap with the second position.

26. The mobile terminal according to claim 15, wherein the first sequence of graphemes comprises distinct graphemes; and
the second sequence of graphemes comprises distinct graphemes.

27. The mobile terminal according to claim 15, wherein the first display is performed by loading contact information of the first set of contact labels to a preset presentation template.

28. The mobile terminal according to claim 27, wherein the presentation template is arranged in one of the following ways:
a staggered overlay way, a ring or a fan arrangement way, and
a front contact information is displayed in a way of a maximum size and full definition while other contact information is displayed in a gradual fading way.

29. The mobile terminal according to claim 15, wherein the processing apparatus comprises a processor, a screen controller, an input controller, an input control device, the processor is connected to the memory, the screen controller is connected to the processor and the display, and the input controller is connected to the processor and the input control device.

30. A non-transitory computer readable storage medium, the readable storage medium storing an executable instruction, when the executable instruction being read by a processor, the processor being capable of providing instructions to perform following steps:
performing a listing of a first sequence of graphemes on a display;
receiving a first input;
performing a selection of a first grapheme from the first sequence of graphemes in response to the first input, the first sequence of graphemes being associated with a first unit of characters relating to a plurality of contact labels, each of the contact labels comprising at least two characters, and each of the at least two characters being represented by at least one grapheme;
performing a first display of a first set of contact labels being searched within the plurality of contact labels, if each of the first set of contact labels comprising a grapheme matching the first grapheme;

performing a listing of a second sequence of graphemes on the display, wherein the first sequence of graphemes is listed at a first position of the display, the second sequence of graphemes is listed at a second position of the display, and the first sequence of graphemes is hidden when the second sequence of graphemes is listed;

receiving a second input;

performing a selection of a second grapheme from the second sequence of graphemes in response to the second input, the second sequence of graphemes being associated with a second unit of characters relating to the plurality of contact labels; and performing an updated display of the first display, the updated display relating to a second set of contact labels being searched within the first set of contact labels, if each of the second set of contact labels comprising a grapheme matching the second grapheme.

* * * * *